United States Patent
Tran et al.

(10) Patent No.: US 9,827,853 B2
(45) Date of Patent: Nov. 28, 2017

(54) WADING VEHICLE ADVISORY SPEED DISPLAY

(75) Inventors: Thuy-Yung Tran, Whitley (GB); Edward Hoare, Whitley (GB); Anthony Jones, Risca (GB); Simon Thomson, Coventry (GB); Ashutosh Tomar, Coventry (GB); Sebastian Paszkowicz, Coventry (GB)

(73) Assignee: Jaguar Land Rover Limited, Whitley, Coventry, Warwickshire (GB)

(*) Notice: Subject to any disclaimer, the term of this patent is extended or adjusted under 35 U.S.C. 154(b) by 0 days.

(21) Appl. No.: 13/994,586

(22) PCT Filed: Dec. 15, 2011

(86) PCT No.: PCT/EP2011/072996
§ 371 (c)(1),
(2), (4) Date: Dec. 2, 2013

(87) PCT Pub. No.: WO2012/080437
PCT Pub. Date: Jun. 21, 2012

(65) Prior Publication Data
US 2014/0288793 A1    Sep. 25, 2014

(30) Foreign Application Priority Data

Dec. 15, 2010 (GB) .................... 1021268.6
Dec. 15, 2010 (GB) .................... 1021272.8
(Continued)

(51) Int. Cl.
G06F 7/00        (2006.01)
B60K 35/00    (2006.01)
(Continued)

(52) U.S. Cl.
CPC ............ *B60K 35/00* (2013.01); *B60C 1/00* (2013.01); *B60G 17/019* (2013.01);
(Continued)

(58) Field of Classification Search
CPC ......... B60G 17/0165; B60G 2300/07; B60G 2800/914; B60W 40/076; B60W 40/105; B60W 50/14; B60W 2050/146
(Continued)

(56) References Cited

U.S. PATENT DOCUMENTS 3,392,694 A    7/1968    Appleton
4,107,994 A    8/1978    Sogo
(Continued)

FOREIGN PATENT DOCUMENTS

DE             19941126 A1     4/2001
DE        102004028157 B3     1/2006
(Continued)

OTHER PUBLICATIONS

International Search Report for PCT/EP2011/072996 dated May 16, 2012, 5 pages.
(Continued)

*Primary Examiner* — Thomas G Black
*Assistant Examiner* — Ce Li
(74) *Attorney, Agent, or Firm* — Reising Ethington P.C.

(57) ABSTRACT

A vehicle comprises a driver display on which is displayed an advisory maximum wading speed according to the current wading depth of the vehicle. The advisory speed is in one embodiment displayed on the vehicle speedometer. The display may also include an elevation of a vehicle on which is indicated one or more of maximum wading depth, current wading depth and vehicle inclination.

21 Claims, 23 Drawing Sheets

(30) Foreign Application Priority Data

| Dec. 15, 2010 | (GB) | ................................... | 1021278.5 |
| Dec. 15, 2010 | (GB) | ................................... | 1021295.9 |
| Dec. 15, 2010 | (GB) | ................................... | 1021296.7 |
| Dec. 15, 2010 | (GB) | ................................... | 1021297.5 |

(51) Int. Cl.

| *G01F 23/28* | (2006.01) |
| *B60G 17/019* | (2006.01) |
| *G01F 23/18* | (2006.01) |
| *B60G 17/0165* | (2006.01) |
| *B60W 40/06* | (2012.01) |
| *B60W 40/076* | (2012.01) |
| *B60W 50/14* | (2012.01) |
| *B60K 37/02* | (2006.01) |
| *F02D 11/10* | (2006.01) |
| *G01F 23/14* | (2006.01) |
| *G01S 15/02* | (2006.01) |
| *G10K 13/00* | (2006.01) |
| *B60C 1/00* | (2006.01) |
| *B60R 99/00* | (2009.01) |
| *G01F 23/24* | (2006.01) |
| *G01F 23/26* | (2006.01) |
| *G01K 13/00* | (2006.01) |
| *G01S 15/93* | (2006.01) |
| *G01S 15/87* | (2006.01) |
| *G01F 23/00* | (2006.01) |
| *G01F 23/296* | (2006.01) |

(52) U.S. Cl.
CPC ... *B60G 17/0165* (2013.01); *B60G 17/01908* (2013.01); *B60K 37/02* (2013.01); *B60R 99/00* (2013.01); *B60W 40/06* (2013.01); *B60W 40/076* (2013.01); *B60W 50/14* (2013.01); *F02D 11/105* (2013.01); *G01F 23/0061* (2013.01); *G01F 23/0076* (2013.01); *G01F 23/14* (2013.01); *G01F 23/18* (2013.01); *G01F 23/24* (2013.01); *G01F 23/242* (2013.01); *G01F 23/263* (2013.01); *G01F 23/265* (2013.01); *G01F 23/28* (2013.01); *G01F 23/2965* (2013.01); *G01K 13/00* (2013.01); *G01S 15/02* (2013.01); *G01S 15/87* (2013.01); *G01S 15/931* (2013.01); *G06F 7/00* (2013.01); *G10K 13/00* (2013.01); *B60G 2300/07* (2013.01); *B60G 2400/80* (2013.01); *B60G 2400/843* (2013.01); *B60G 2500/30* (2013.01); *B60G 2800/914* (2013.01); *B60K 2350/1076* (2013.01); *B60W 2050/146* (2013.01); *B60W 2420/54* (2013.01); *B60W 2520/16* (2013.01); *B60W 2520/18* (2013.01); *B60W 2550/14* (2013.01); *B60W 2550/142* (2013.01); *B60W 2550/147* (2013.01); *G01F 23/00* (2013.01); *G01F 23/296* (2013.01); *G01S 2015/932* (2013.01); *G01S 2015/938* (2013.01); *Y02T 10/84* (2013.01); *Y10S 367/908* (2013.01); *Y10S 903/93* (2013.01)

(58) Field of Classification Search
USPC ............... 701/36–38, 70, 93; 73/1.79, 1.81
See application file for complete search history.

(56) References Cited

U.S. PATENT DOCUMENTS

| 4,144,517 | A | | 3/1979 | Baumoel |
| 5,173,692 | A | | 12/1992 | Shapiro et al. |
| 5,521,594 | A | | 5/1996 | Fukushima |
| 5,978,736 | A | | 11/1999 | Greendale |
| 6,430,985 | B1 | | 8/2002 | Drees |
| 6,633,811 | B1 | * | 10/2003 | Aumayer ............ B60K 31/185 180/170 |
| 7,631,618 | B2 | * | 12/2009 | Hall et al. .................... 123/41.1 |
| 7,739,905 | B2 | * | 6/2010 | Spetler .......................... 73/146 |
| 8,473,173 | B1 | | 6/2013 | Robles |
| 9,026,310 | B2 | | 5/2015 | Tran et al. |
| 2003/0005765 | A1 | | 1/2003 | Brudis et al. |
| 2005/0170710 | A1 | | 8/2005 | Darby et al. |
| 2005/0284218 | A1 | | 12/2005 | Lagergren |
| 2006/0113129 | A1 | | 6/2006 | Tabata |
| 2007/0007056 | A1 | | 1/2007 | Bowers et al. |
| 2007/0167092 | A1 | | 7/2007 | Rees et al. |
| 2007/0221430 | A1 | | 9/2007 | Allison, Sr. |
| 2007/0244606 | A1 | | 10/2007 | Zhang et al. |
| 2008/0030313 | A1 | | 2/2008 | Obradovich |
| 2008/0306641 | A1 | * | 12/2008 | Matusiak, Jr. ........ B61L 15/009 701/19 |
| 2008/0319618 | A1 | | 12/2008 | Sjogren et al. |
| 2009/0030581 | A1 | * | 1/2009 | Pollklas et al. ................. 701/50 |
| 2009/0150035 | A1 | | 6/2009 | Soliman et al. |
| 2009/0159020 | A1 | | 6/2009 | Hall et al. |
| 2010/0045452 | A1 | * | 2/2010 | Periwal ........................ 340/439 |
| 2010/0057324 | A1 | | 3/2010 | Glugla et al. |
| 2010/0085198 | A1 | | 4/2010 | Boss et al. |
| 2010/0101226 | A1 | | 4/2010 | Shutty et al. |
| 2010/0112387 | A1 | | 5/2010 | Nagasawa |
| 2013/0307679 | A1 | | 11/2013 | Tran et al. |
| 2013/0336090 | A1 | | 12/2013 | Tran et al. |
| 2014/0085066 | A1 | | 3/2014 | Tran et al. |
| 2014/0156126 | A1 | | 6/2014 | Tran et al. |
| 2014/0184247 | A1 | | 7/2014 | Tran et al. |
| 2014/0293746 | A1 | | 10/2014 | Tran et al. |
| 2014/0347178 | A1 | | 11/2014 | Tran et al. |
| 2015/0033846 | A1 | | 2/2015 | Tran et al. |

FOREIGN PATENT DOCUMENTS

| DE | 102005038345 A1 | 2/2007 |
| DE | 102008042016 A1 | 3/2010 |
| FR | 2622639 A1 | 5/1989 |
| GB | 2356602 A | 5/2001 |
| GB | 2376929 A | 12/2002 |
| KR | 20110109614 A | 10/2011 |
| KR | 20110109618 A | 10/2011 |
| NL | 1011780 C2 | 10/2000 |
| RU | 2168419 C1 | 6/2001 |
| WO | 03002378 A1 | 1/2003 |
| WO | 2009013606 A2 | 1/2009 |

OTHER PUBLICATIONS

Combined Search and Examination Report corresponding to application No. GB1121618.1, dated Apr. 24, 2012.

* cited by examiner

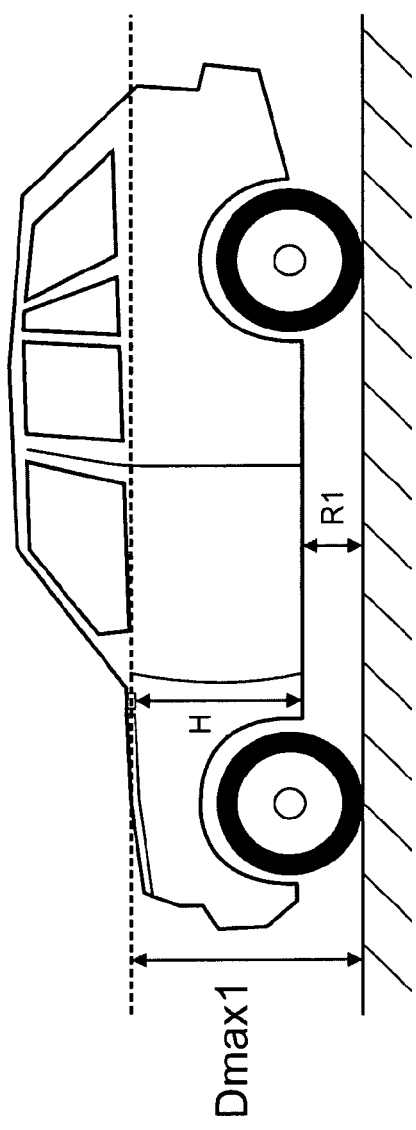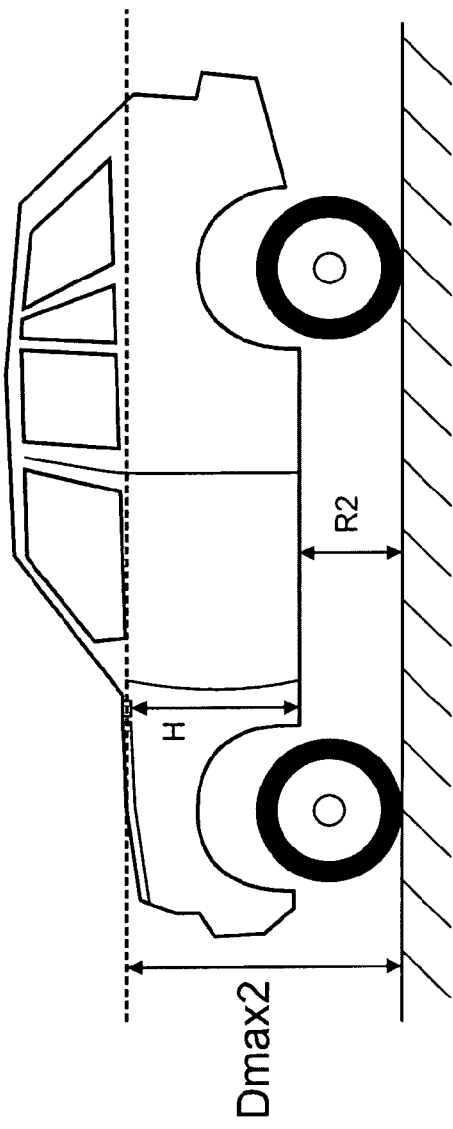

WADING VEHICLE ADVISORY SPEED DISPLAY

TECHNICAL FIELD

The present invention is concerned with a human machine interface for displaying the water level relative to a vehicle body. More particularly, but not exclusively, the present invention is concerned with display of the water level of a wading vehicle and providing such information to a driver of the vehicle. Aspects of the invention relate to vehicle, a method and a system.

BACKGROUND

An off-road vehicle may be defined as a road vehicle having some off road capability—such as the provision of all wheel drive. Off road vehicles are often required to travel through water to reach their intended destination. Travel through deep water (typically over about 0.3 m in depth) is known as "wading". Known off-road vehicles are designed to wade, and comprise suitably sealed closures to avoid ingress of water into the passenger compartment. The engine air intake is positioned at an elevated position (normally directly in front of and below the windscreen) to prevent water being ingested into the engine, and this intake will often dictate the maximum level of water relative to the body that the vehicle can wade through.

Prior art methods of determining if the water level is safe to wade through include referring to depth gauges, e.g. permanent graduated poles situated within the water in the case of fords and measurement of the depth by the driver using a partially submerged stick or pole.

As discussed, the maximum wading depth is determined by the position of a point on the vehicle body (e.g. the engine air intake). Because the ride height of the vehicle is often variable (due to the variable height of the suspension system) the permissible absolute depth of water which the vehicle can wade through varies depending on the selected ride height of the suspension system.

The behaviour of the water around a wading vehicle is influenced by the vehicle's speed. The driver will typically want to travel as fast as possible (to reach a destination) but high speed travel whilst wading is not advisable. Waves from the vehicle may damage surrounding structures (and lap over e.g. flood defences) and excessive speed may cause waves to lap over the vehicle itself, entering e.g. the engine air intake. Evidently the maximum speed at which the wading vehicle can travel whilst avoiding these effects depends on factors such as water depth and pitch of the ground surface, but unless the driver is highly experienced in wading there is a significant risk that the maximum speed may be exceeded for a given set of wading conditions. Very low speed wading may be indicated in urban environments to avoid damage due to the vehicle's wash.

An aim of the present invention is to at least mitigate the above mentioned problems by providing better information to the driver.

SUMMARY

Aspects of the invention relate to vehicle, a method and a system as claimed in the appended claims.

According to another aspect of the present invention for which protection is sought, there is provided a vehicle comprising a wading depth sensor, a display, a memory and a processor, the memory containing a program configured to run on the processor to calculate an advisory maximum vehicle speed according to current wading depth, and to display said advisory speed on the display.

The provision of an advised maximum wading speed will assist the driver in avoiding unnecessary risk or damage to the vehicle.

The advised maximum speed may be displayed in a dedicated display area on the dashboard. The advised maximum speed may be displayed or overlaid on the vehicle speedometer.

In one embodiment the memory may contain a program configured to run on the processor to calculate the maximum wading depth of the vehicle from the vehicle ride height, and to display the maximum wading depth on the display.

An accurate display of maximum wading depth can be displayed which accounts for variable height suspension. The driver can then make an informed decision on whether to enter or continue thorough water of a known depth (the depth being known from a roadside gauge, or measured by the driver or onboard vehicle systems).

In one embodiment the display comprises of an elevation of the vehicle on which is superimposed a line indicative of maximum wading depth. The position of the line on the vehicle may change according to a selected vehicle ride height.

In one embodiment of the present invention, the display configured to show the current water level through which the vehicle is wading. Optionally, the water level is displayed in increments which decrease as the wading depth approaches the maximum wading depth.

Wading depth can be provided to a vehicle control unit from any suitably enabled sensor, or by reference to topographical data and information about vehicle position, for example from GPS.

The decrease in increment size means that the display will provide increasingly accurate readings to the driver as the maximum level approaches. This is beneficial because the water level is far more critical as it approaches the permitted maximum. Displaying larger increments at lower depth levels prevents the display causing an unnecessary distraction with frequent non-critical updates, according to the refresh rate of the system.

The information may also be configured to advise the driver of the activation of relevant driving aids such as adjustment of ride height to a maximum, or activation of an off-road mode. It may also offer advice in message form, such as checking that the water exit is clear.

In one embodiment both maximum wading depth and real time wading depth are simultaneously displayed, for example by reference to a vehicle elevation. The elevation may be front/rear and/or from the side.

The maximum wading depth may be adjusted depending on the movement and/or orientation of the vehicle. For example, when travelling forward the maximum depth may be the height of the engine intake. When travelling rearwardly at a negative inclination (e.g. down a slipway) the maximum depth may be the bottom of the tailgate glazing.

The display may for example show an elevation of the vehicle at the real time pitch or roll angle, with superimposed lines or colour washes indicative of maximum wading depth, and actual wading depth.

According to another aspect of the present invention, there is provided a method of displaying an advisory speed of a vehicle to a driver whilst wading, the method comprising the steps of determining an advisory maximum vehicle speed according to a wading depth sensor, and displaying said advisory speed on a driver display of current vehicle speed.

Optionally, the method includes the step of adjusting said advisory speed according to the inclination of the vehicle indicated by an inclination sensor thereof.

The method may comprise the steps of calculating the maximum wading depth of the vehicle according to the ride height thereof, and displaying on said display an elevation of a vehicle on which is superimposed said maximum wading depth.

In some embodiments the method according further includes the step of simultaneously displaying on said display an elevation of a vehicle on which is superimposed the actual wading depth of the vehicle according to information from one or more wading sensors.

According to still another aspect of the present invention, there is provided a wading vehicle system comprising a wading depth sensor, a display, a memory and a processor, the memory containing a program configured to run on the processor to calculate an advisory maximum vehicle speed according to current wading depth, and to display said advisory speed on the display.

According to yet another aspect of the present invention, there is provided a vehicle comprising a wading information display, a memory and a processor, the memory containing a program configured to run on the processor to calculate an advised maximum wading speed of the vehicle from one or more of (i) the water level through which the vehicle is wading, (ii) the pitch of the vehicle and (iii) the angle of the terrain on which the vehicle is travelling, and to display the advised maximum wading speed on the display.

According to a further aspect of the present invention there is provided a computer program stored on a memory device for execution on a processor comprising: interpreting data to detect a wading condition of a vehicle; determining an advisory maximum vehicle speed in dependence on one or more driving conditions of the vehicle; and displaying said advisory speed on a driver display of current vehicle speed.

Within the scope of this application it is envisaged that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Embodiments of the present invention will now be described, by way of example only, with reference to the accompanying Figures in which:

FIG. 2 is a side view of the vehicle of FIG. 1 wading with a first suspension ride height;

FIG. 3 is a side view of the vehicle of FIG. 1 wading with a second suspension ride height;

DETAILED DESCRIPTION

Figure 1:
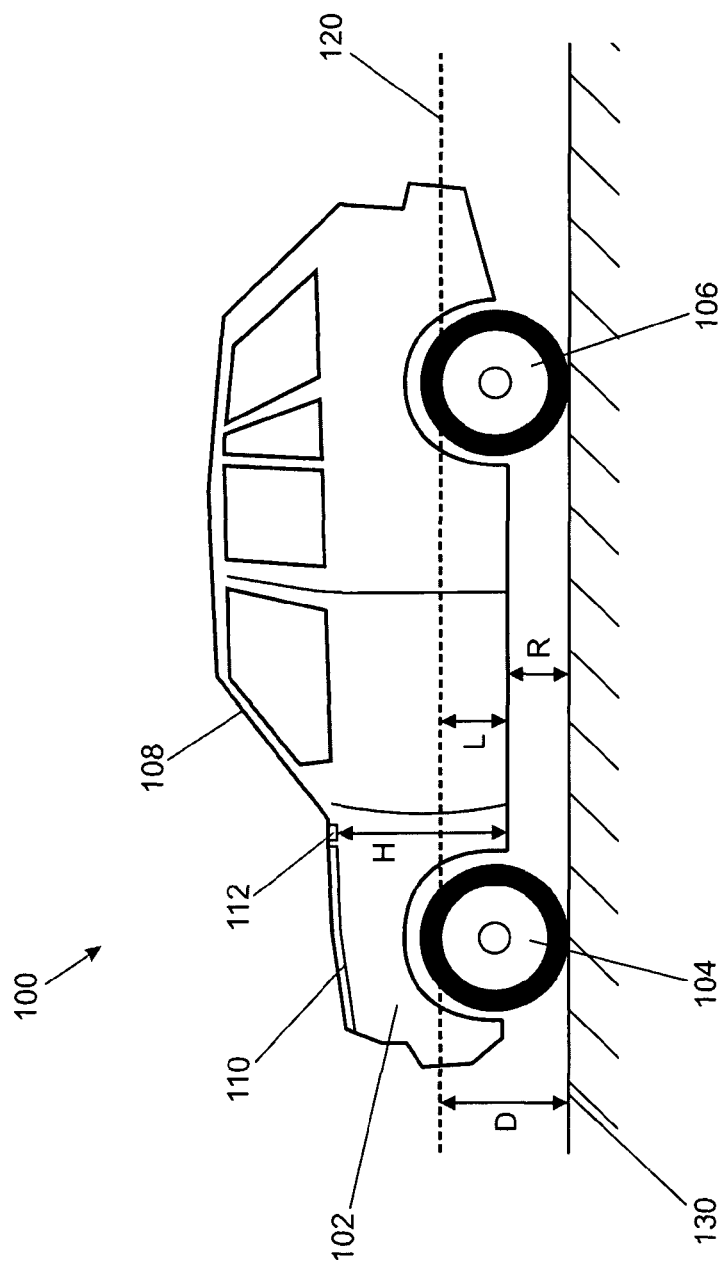
FIG. 1 is a schematic side view of a wading off-road vehicle according to embodiments of the present invention.

Referring to FIG. 1, a vehicle 100 comprises a body 102, a left front wheel 104 and a left rear wheel 106. The wheels 104, 106 (and their counterparts on the right hand side of the vehicle 100) are connected to the body 102 via a suspension (not shown). Each of the wheels 104, 106 comprises a tyre.

The wheels 104, 106 can move relative to the body 102 to define a ride height R between the lowermost point of the tyres (where they contact the ground) and the lowermost point on the body. The ride height R varies with suspension travel and may be varied by the driver (for example to move from an on-road mode when R is small to an off-road mode when R is large).

The body 102 comprises a windscreen 108 and a bonnet (or hood) 110 covering an engine bay. On the body 102 between the windscreen 108 and the bonnet 110 there is defined and engine intake orifice 112. The orifice 112 is connected to an air filter and intake manifold of the engine (not shown). The intake orifice 112 is positioned at a height H from the lowermost part of the body 102.

The vehicle 100 is shown wading through water 120 at a water depth D from a ground level 130. The water depth D should be distinguished from the water level represented by L which is the level of the water 120 above the lowermost point on the body 102.

It will be noted that although D can be measured (by a roadside gauge or a measuring stick); the distance L is unknown (as R can vary).

Turning to FIGS. 2 and 3, the vehicle 100 is shown having a first ride height R1 in FIG. 2 and a second, larger, ride height R2 in FIG. 3. Referring to FIG. 1, the maximum depth of water until the intake orifice 112 becomes wet is Dmax1=R1+H. In FIG. 2 it is Dmax2=R2+H.

Figure 4A:
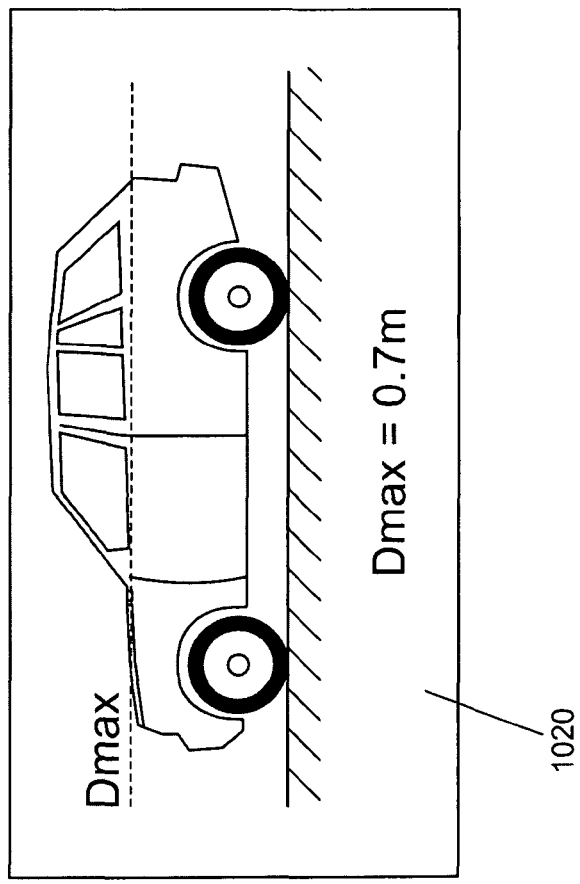
FIG. 4a is a view of a wading display of the vehicle of FIG. 1.
Figure 4:
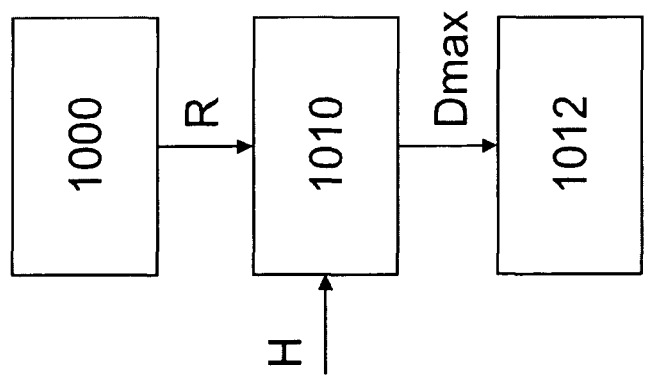
FIG. 4 is a flow chart of a method according to the an embodiment of the invention.

The vehicle 100 comprises an onboard ride height sensor (not shown) of known type. Turning to FIG. 4 a sequence of events according an embodiment of the invention is shown. At step 1000 the vehicle ride height R is sensed using the known onboard sensors. The ride height R is then added to the known height H of the air intake orifice 112 relative to the bottom of the vehicle 100. This represents a safe maximum depth Dmax which is communicated to, and displayed on a driver information display at step 1012. A display 1020 is shown in FIG. 4a according to an embodiment of the invention. The driver can then use a measured depth D of water 120 (either by gauge or onboard depth measurement) to decide whether to proceed.

Figure 5:
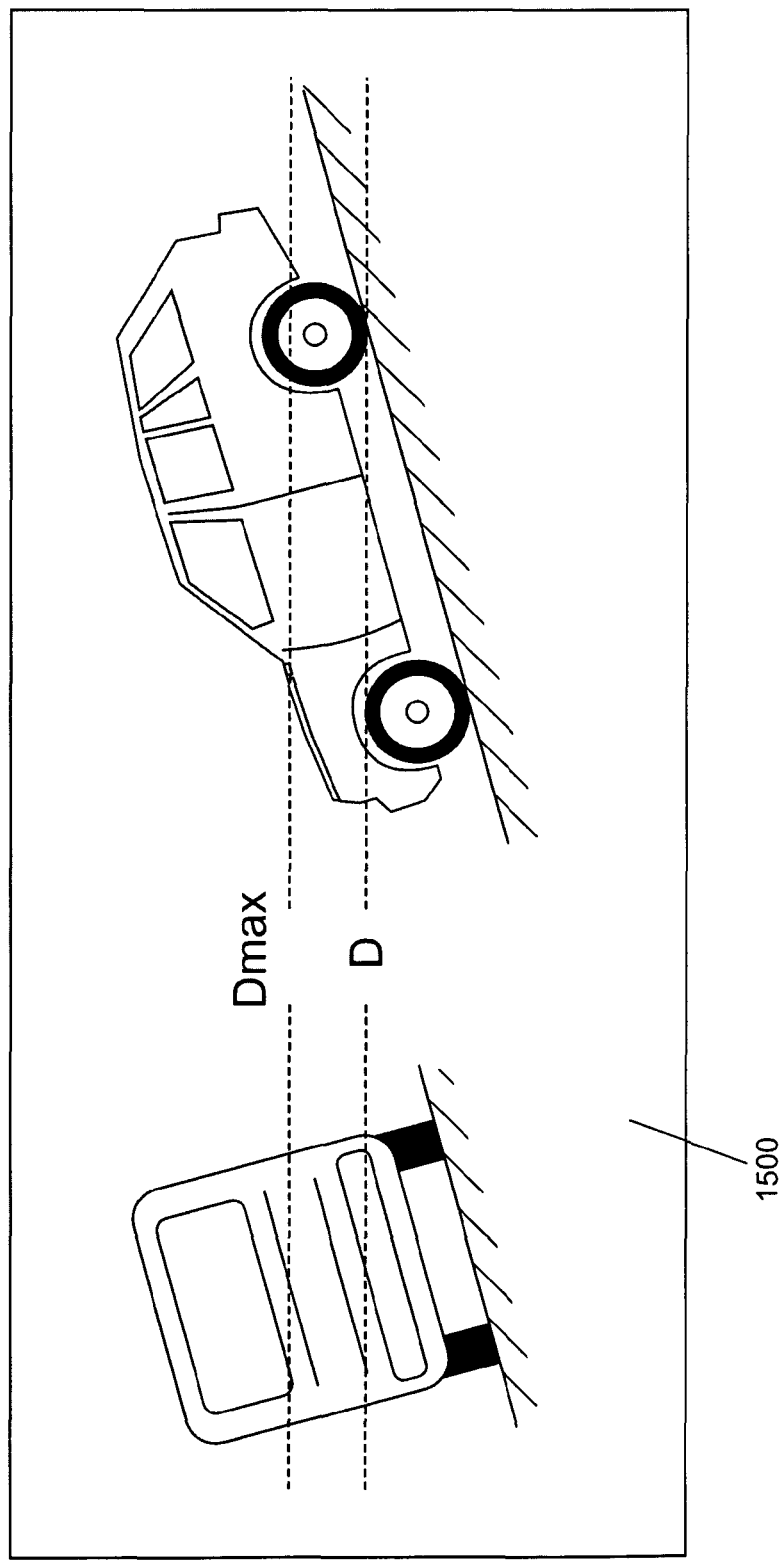
FIG. 5 is a view of a wading display according to an alternative embodiment of the invention.

In an alternative embodiment there is provided a display 1500 as illustrated in in FIG. 5, in which the maximum wading depth Dmax is shown, as well as the current measured wading depth D (as measured by an on board water level sensor, e.g. a capacitive, resistive or hydrostatic sensor) and the inclination of the vehicle as measured by onboard tilt sensors. The driver then has an accurate depiction of the water level L at all positions on the vehicle 100.

Figure 6A:
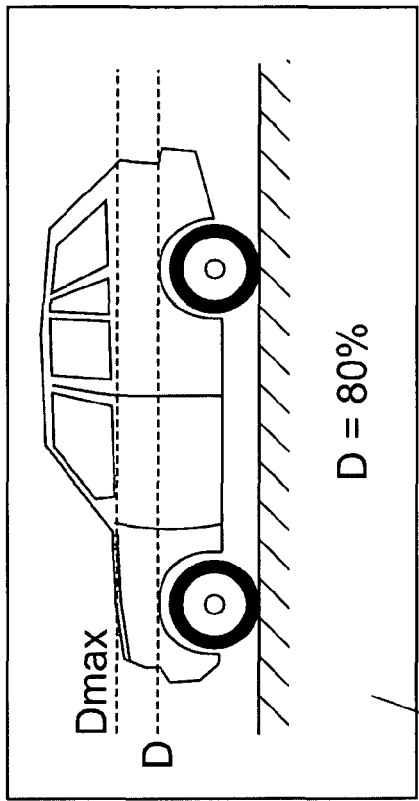
FIGS. 6a to 6d are views of the wading display of FIG. 4a in a plurality of states of depth in accordance with the another embodiment of the invention.
Figure 6C:
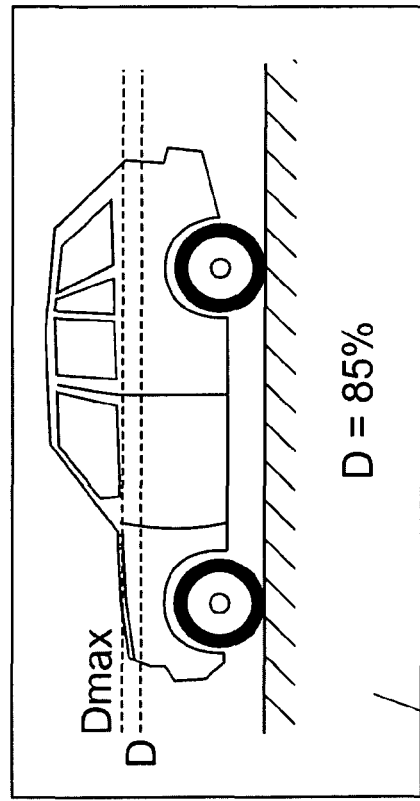
Figure 6B:
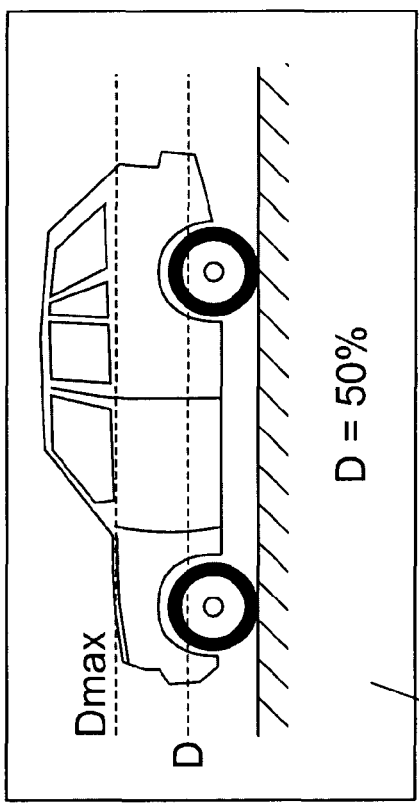
Figure 6D:
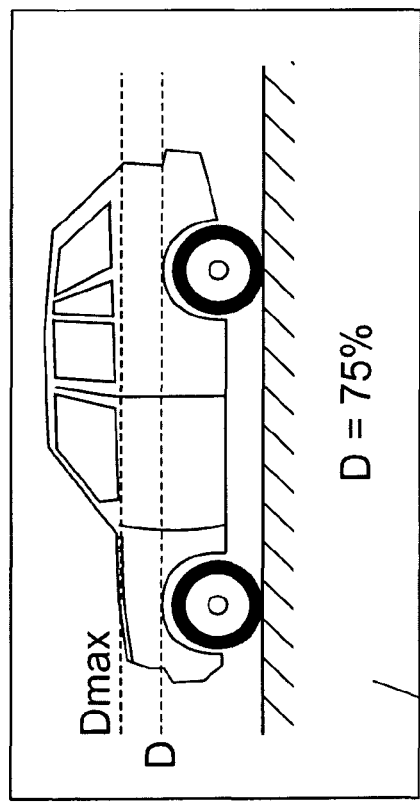

Turning to FIGS. 6a to 6d, a driver information display 1020 is shown in varying states. The display 1020 is connected to a computer memory having software configured to control the display output when run on an associated processor. The software controls the display 1020 by showing the wading depth D at a series of discrete levels. Referring to FIG. 6a, 50 percent depth is shown, 75 percent in FIG. 6b, 80 percent in FIG. 6c and 85 percent in FIG. 6d. As will be noted, the increment between each level becomes smaller towards 100 percent. In this example, the display is configured to have nine discrete states—25, 50 (FIG. 6a), 75 (FIG. 6b), 80 (FIG. 6c), 85 (FIG. 6d), 90, 95, 97.5 and 100 percent. Increments of 25 percent are suitable at low levels (the water level L is of little concern) decreasing to 2.5 percent at higher levels, where water 120 ingress is a risk.

Figure 7:
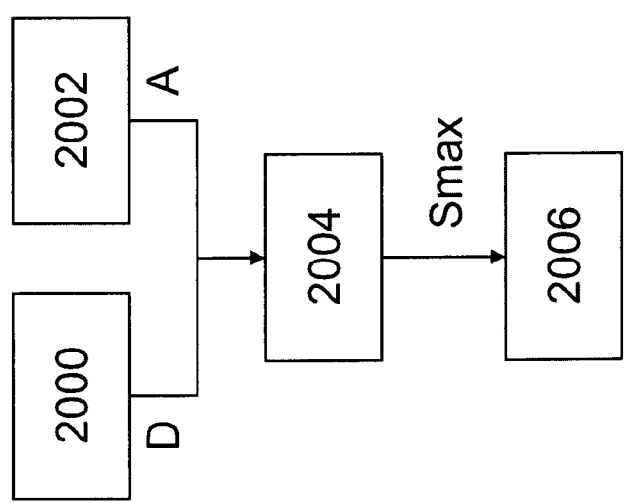
FIG. 7 is a flow chart of a method of calculating an advised maximum speed, in accordance with still another embodiment of the invention.

Turning to FIG. 7, there is illustrated another embodiment of the invention which provides a process for calculating an advised maximum wading speed is shown. At step 2000 the water depth D is measured using an onboard water depth measuring system. At step 2002, the vehicle inclination A is measured using an inclination transducer. At step 2004 depth D and vehicle inclination A are used to determine an advised maximum wading speed Smax which is displayed to the driver at step 2006. The maximum wading speed Smax is calculated to decrease with increased depth D, and decrease with increased inclination A. It is possible that for negative values of inclination A (when the vehicle 100 is travelling uphill) Smax will increase as the vehicle 100 leaves the water 120.

The relationship between maximum wading speed and wading depth may vary with vehicle type and specification; for example the location of the engine air intake may influence the desired position of the bow wave relative to the vehicle leading edge. The relationship may be defined in a look-up table giving advisory speeds for increments of water depth, or by an algorithm performed in a vehicle ECU. Generally, the relationship between wading depth and advisory maximum speed has a strong linear correlation.

Figure 8A:
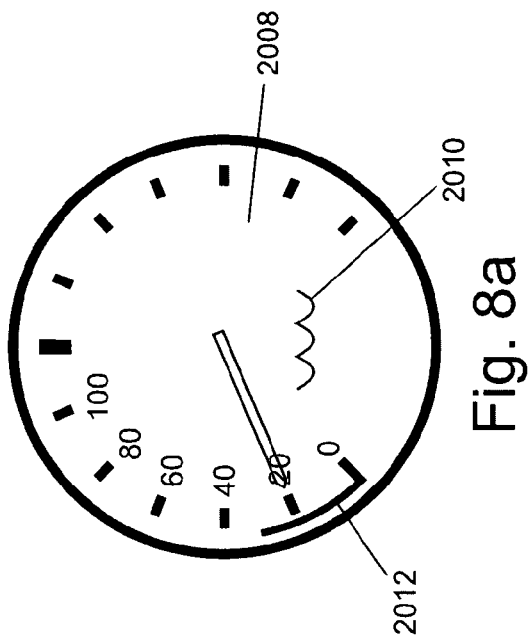
FIGS. 8a and 8b are alternative views of a display in accordance with a further embodiment of the invention.
Figure 8B:
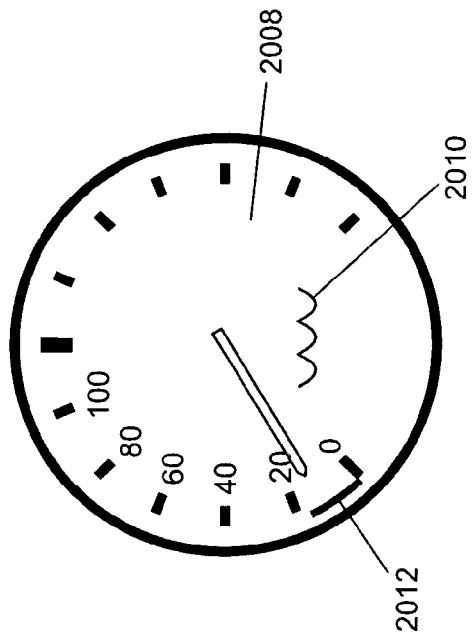

Referring to FIGS. 8a and 8b, an advised maximum speed display 2008 is shown.

The display 2008 is a speedometer displayed on a vehicle multi-function display. A wading indicator 2010 is provided which is illuminated if a wading event is detected. A safe speed range indicator 2012 is also illuminated which highlights a range of speeds (typically 0 to Smax) at which it is safe to travel without causing damage to surrounding objects or the vehicle 100 itself. In FIG. 8a Smax is calculated higher than in 8b. The indications of current and maximum wading depth may be provided simultaneously with the display of advisory wading speed.

FIGS. 9 to 25 illustrate embodiments of the invention, in particular there is illustrated a driver display for use in a vehicle 100 when wading. Information for causing the display to appear, to change, and to show information is provided by the sensors which indicate wading and depth of wading D, in particular an ultrasonic sensor such as PDC (parking distance control) sensors. A suitable electronic control system can utilize the outputs of such sensors to control a vehicle display 1020, 1500 in a generally well-known manner.

Figure 9:
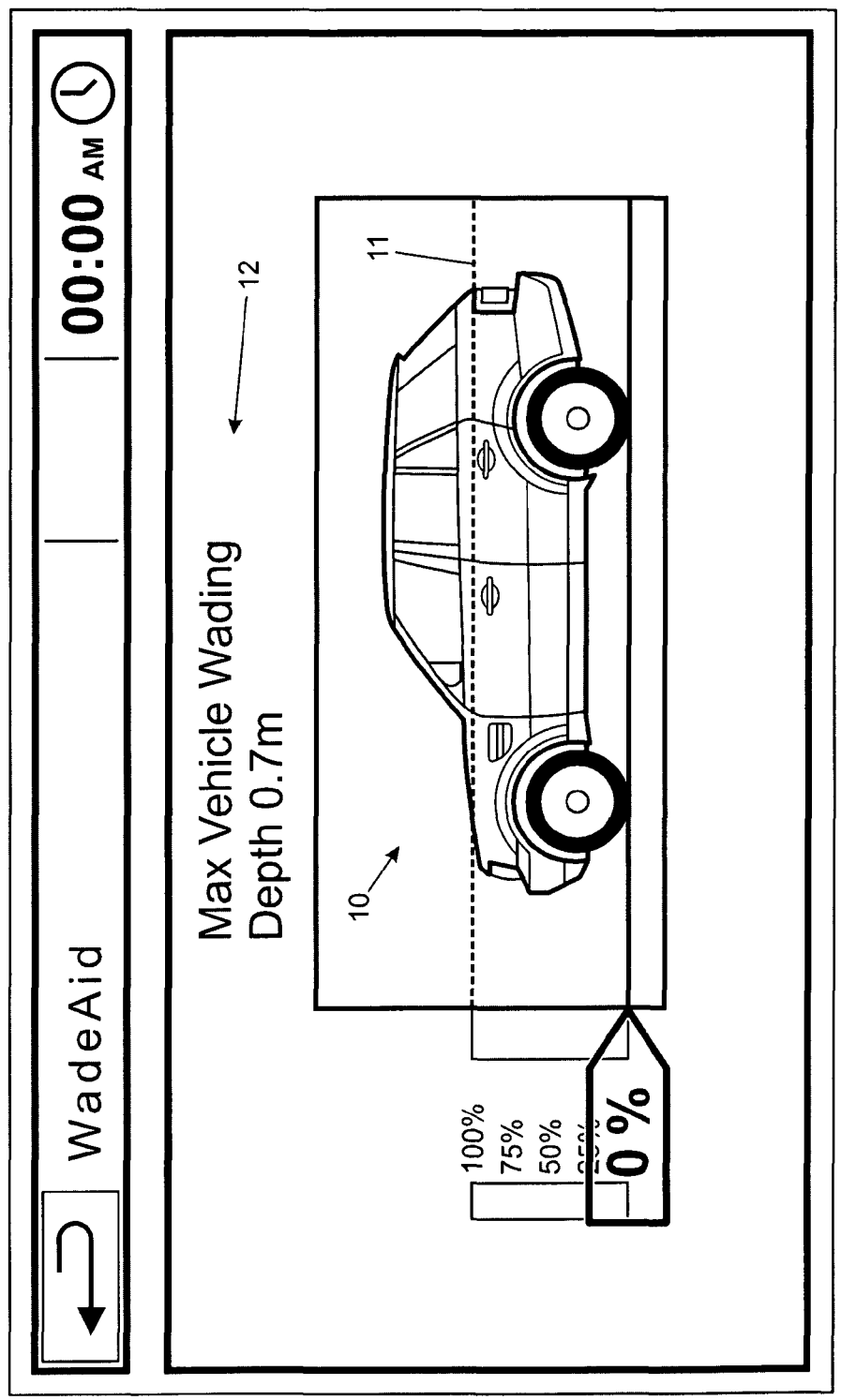
FIGS. 9-25 illustrate display formats for a driver display according to embodiments of the invention.

FIG. 9 shows a representation of a vehicle 10, a dotted line 11 indicating maximum wading depth in the illustrated embodiment the maximum wading depth of the vehicle 10 is of 0.7 m, and a text display 12 of maximum wading depth.

Figure 10:
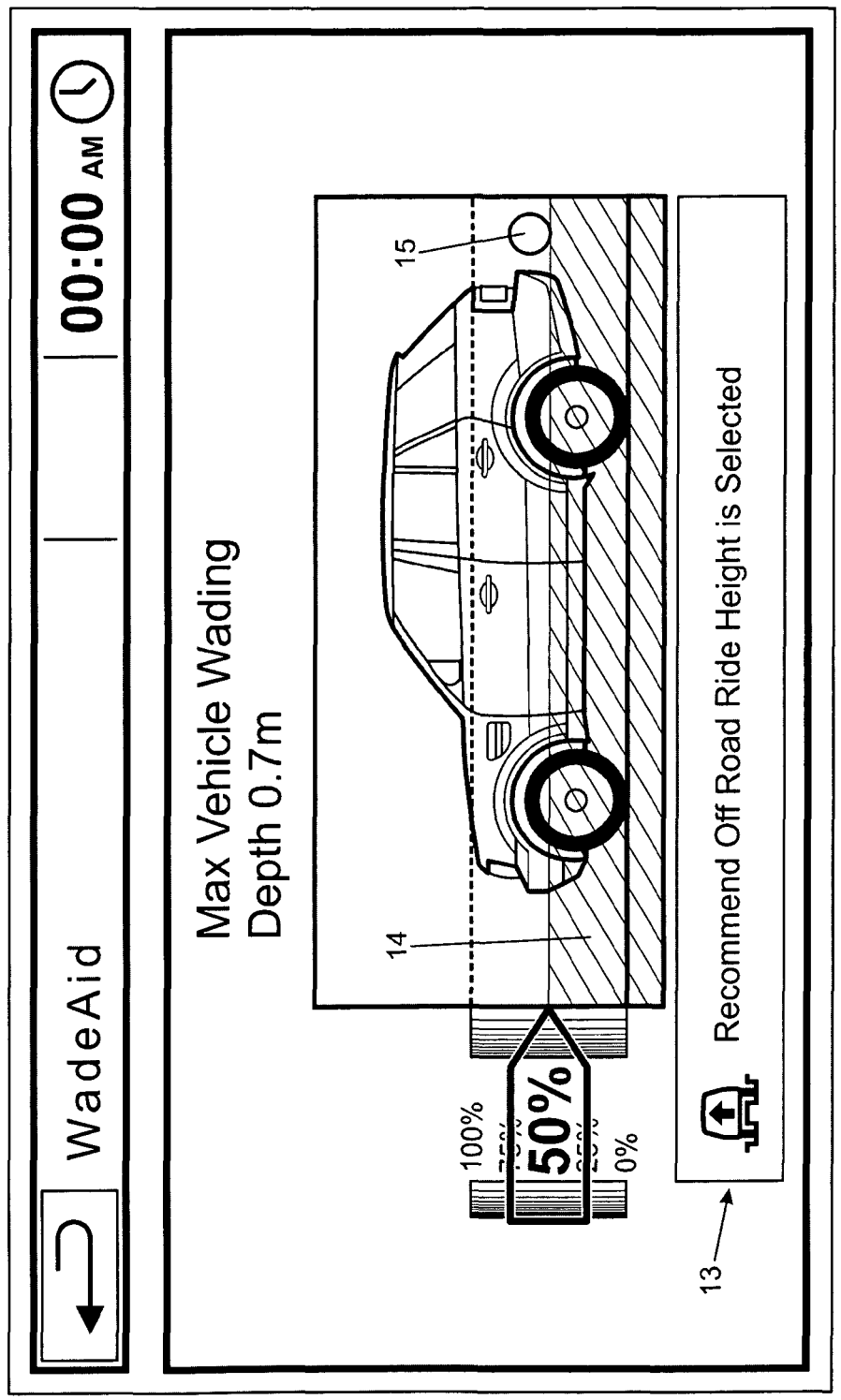

FIG. 10 corresponds to FIG. 9 and also illustrates also an icon 13 indicating raised suspension, and a band 14 indicative of actual wading depth. The band 14 may comprise a colour wash. A water level icon 15 intuitively demonstrates water level, by appearing to float at the indicated level of water.

Figure 11:
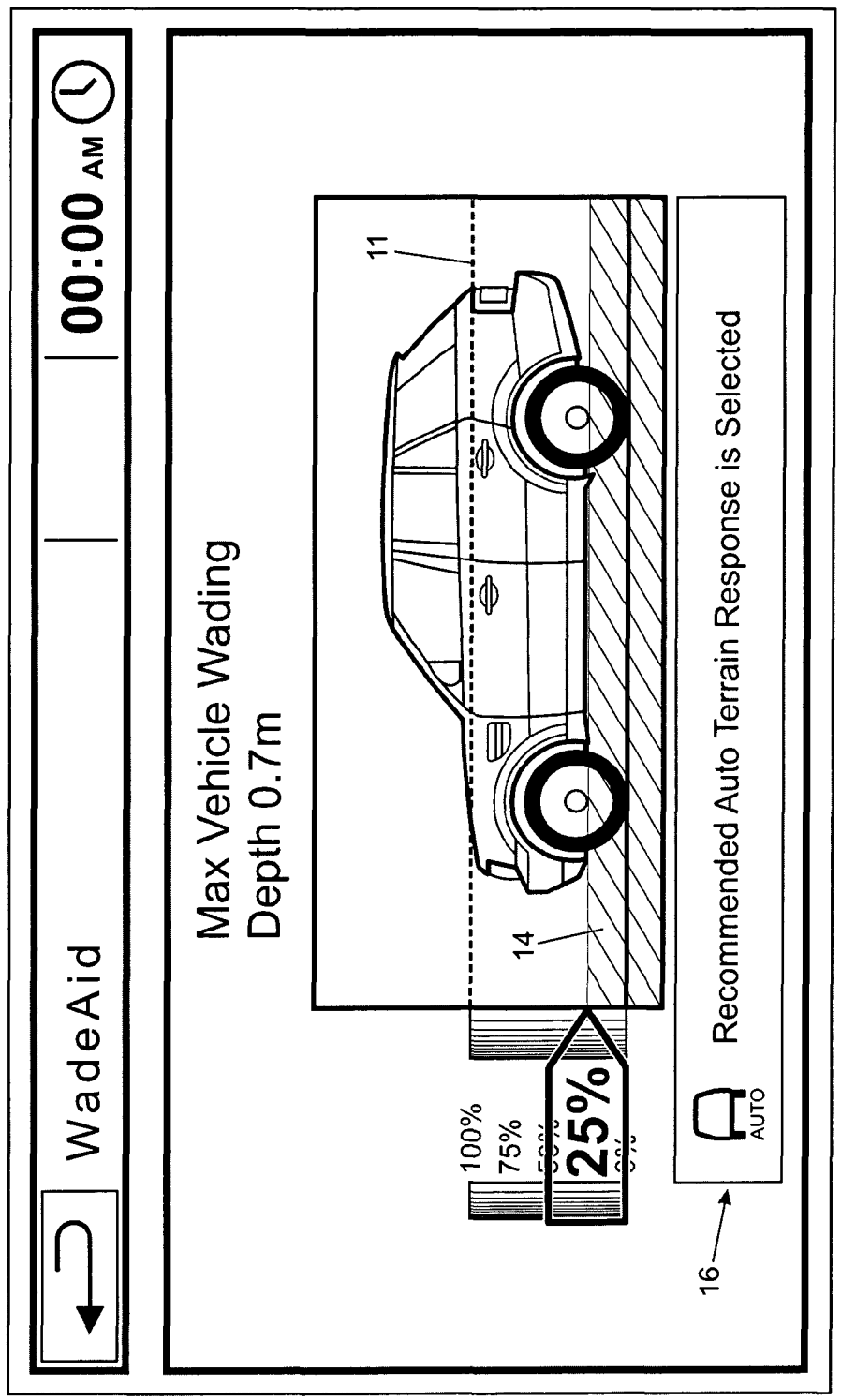

FIG. 11 shows a lower wading depth 14 corresponding with a normal height suspension setting, indicated by the icon 16.

Figure 12:
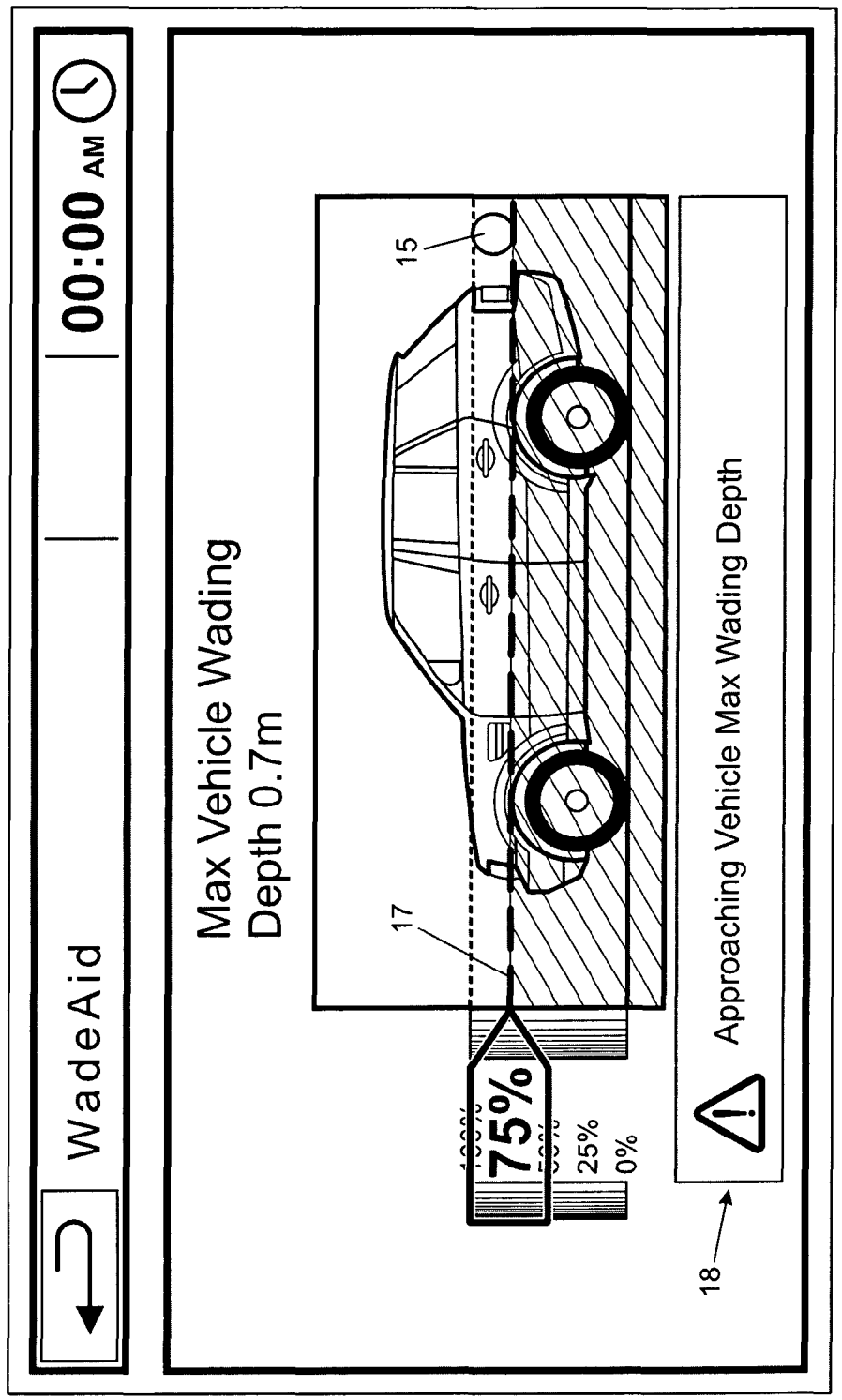

FIG. 12 shows a vehicle wading at a level indicated by the dotted line 17 with a colour wash below, for example a blue colour wash, and the water level icon 15. The line 17 raises and falls in real time according to actual water level. A caution icon 18 is also displayed.

Figure 13:
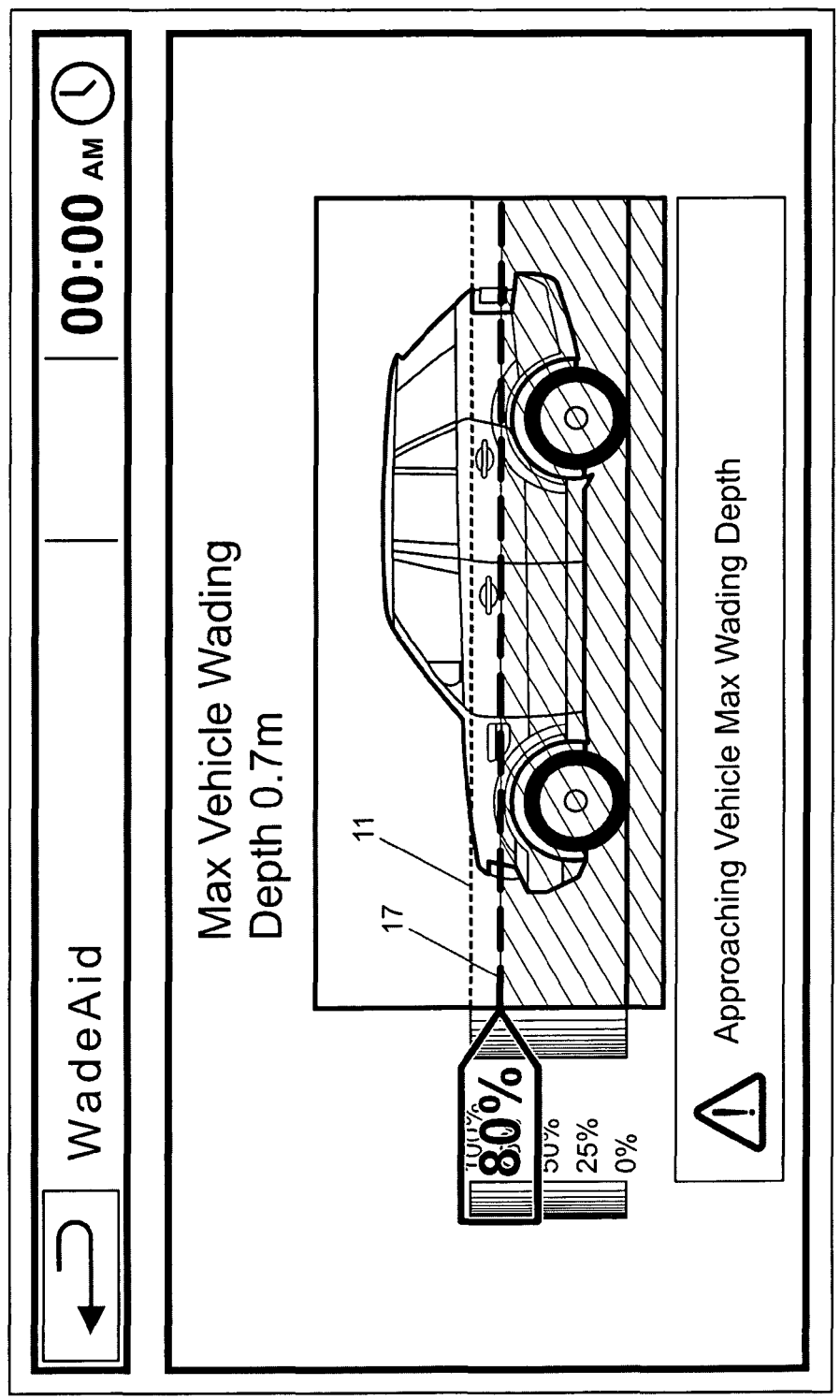

FIG. 13 illustrates a text indicator showing in text the percentage of maximum permissible depth of wading, in this case 80%, a dotted line at the 80% level, and a dotted line at the level of maximum permissible immersion.

Figure 14:
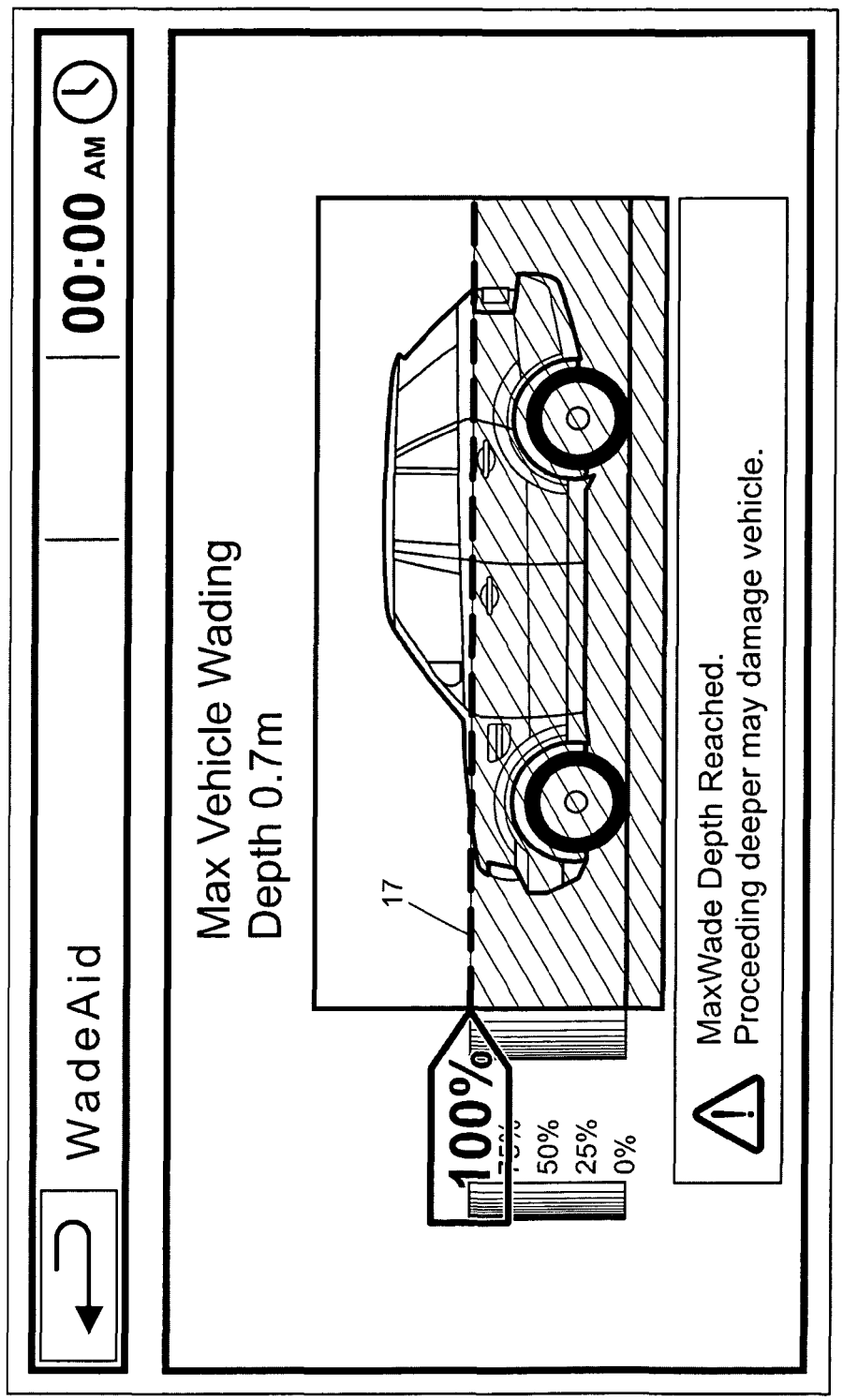

FIG. 14 shows a vehicle at maximum wading depth with the colour wash and dotted line 17 coinciding with the dotted line 11.

Figure 15:
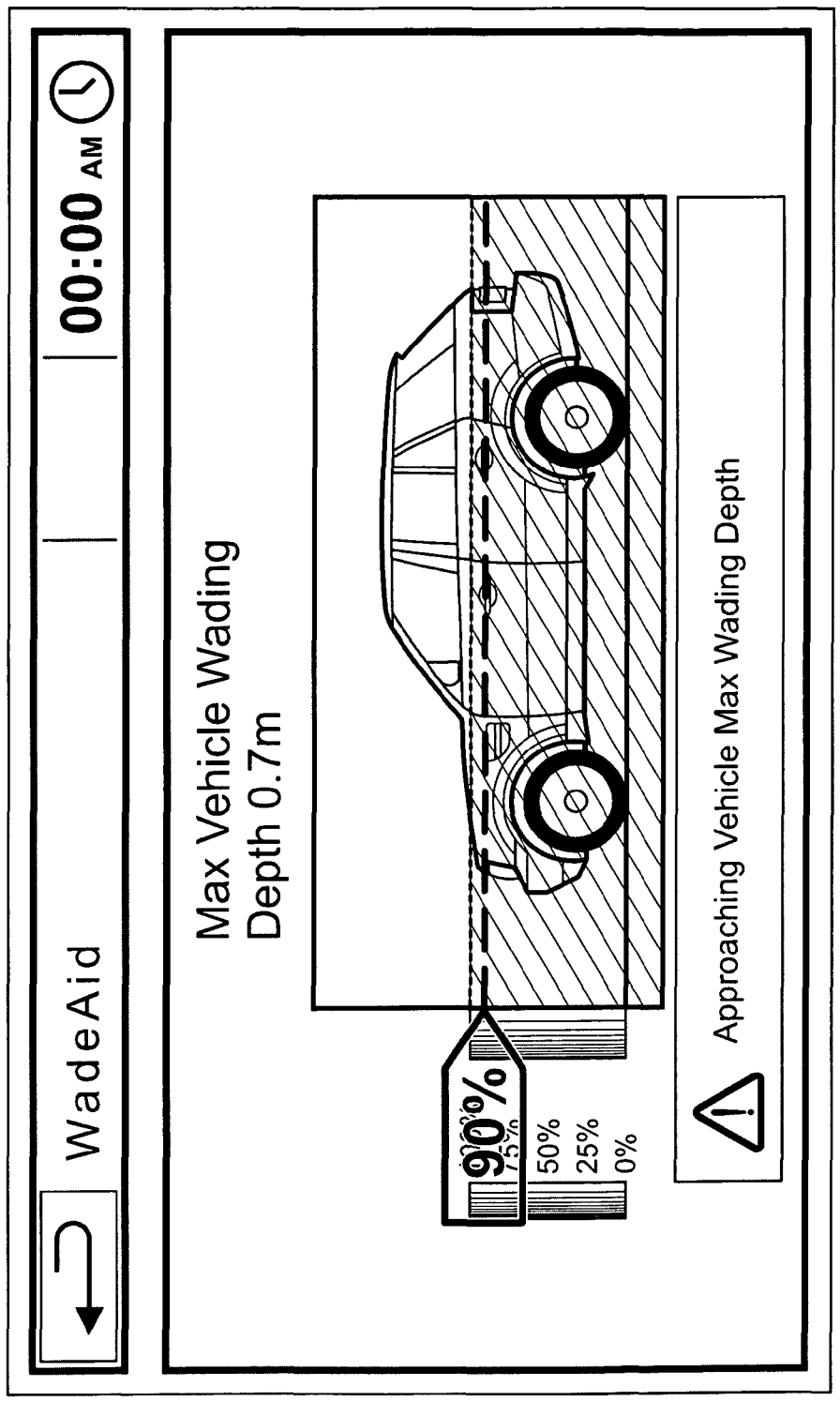

FIG. 15 corresponds to FIG. 13 and shows a vehicle at 90% of maximum wading depth.

Figure 16:
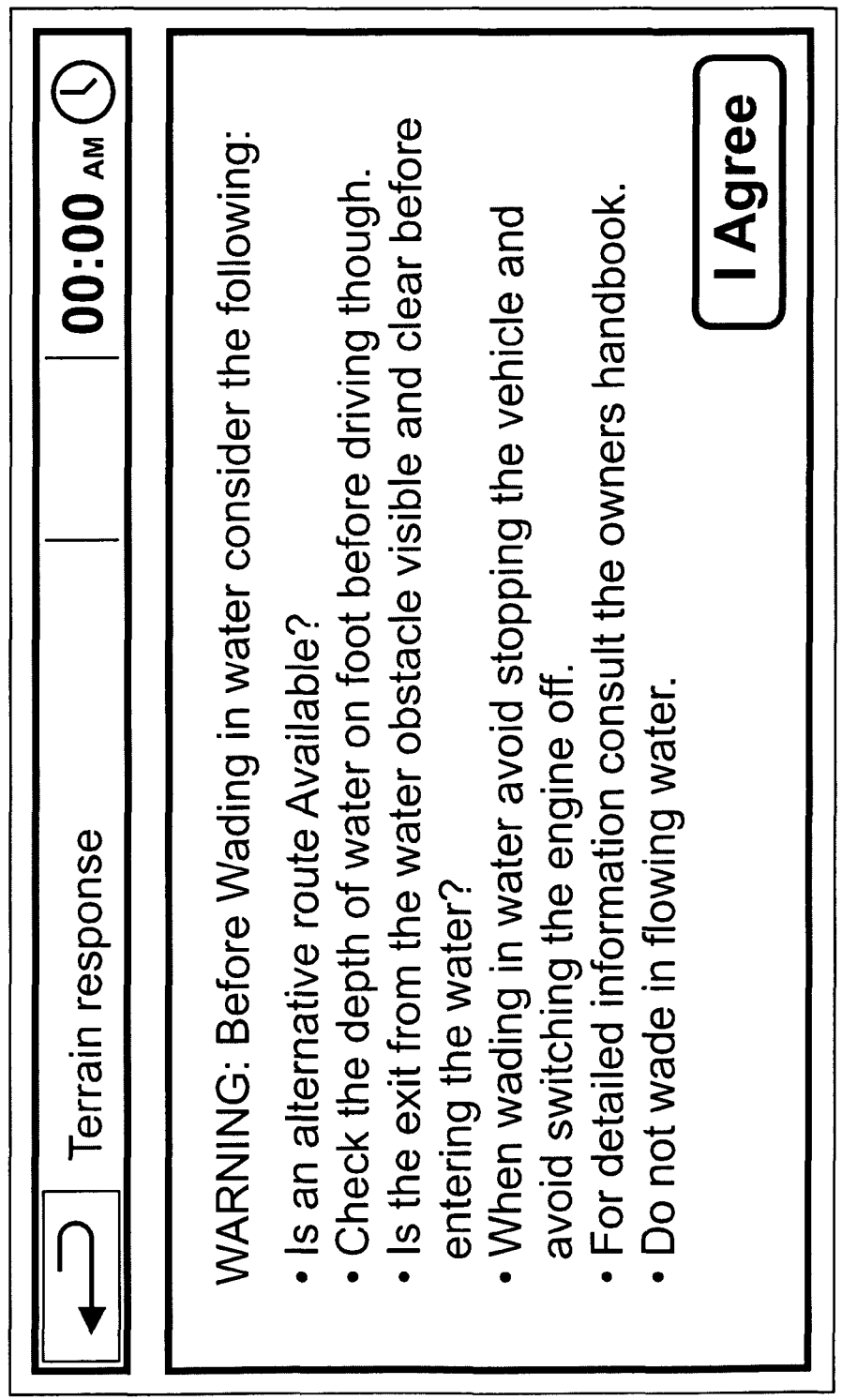
Figure 17:
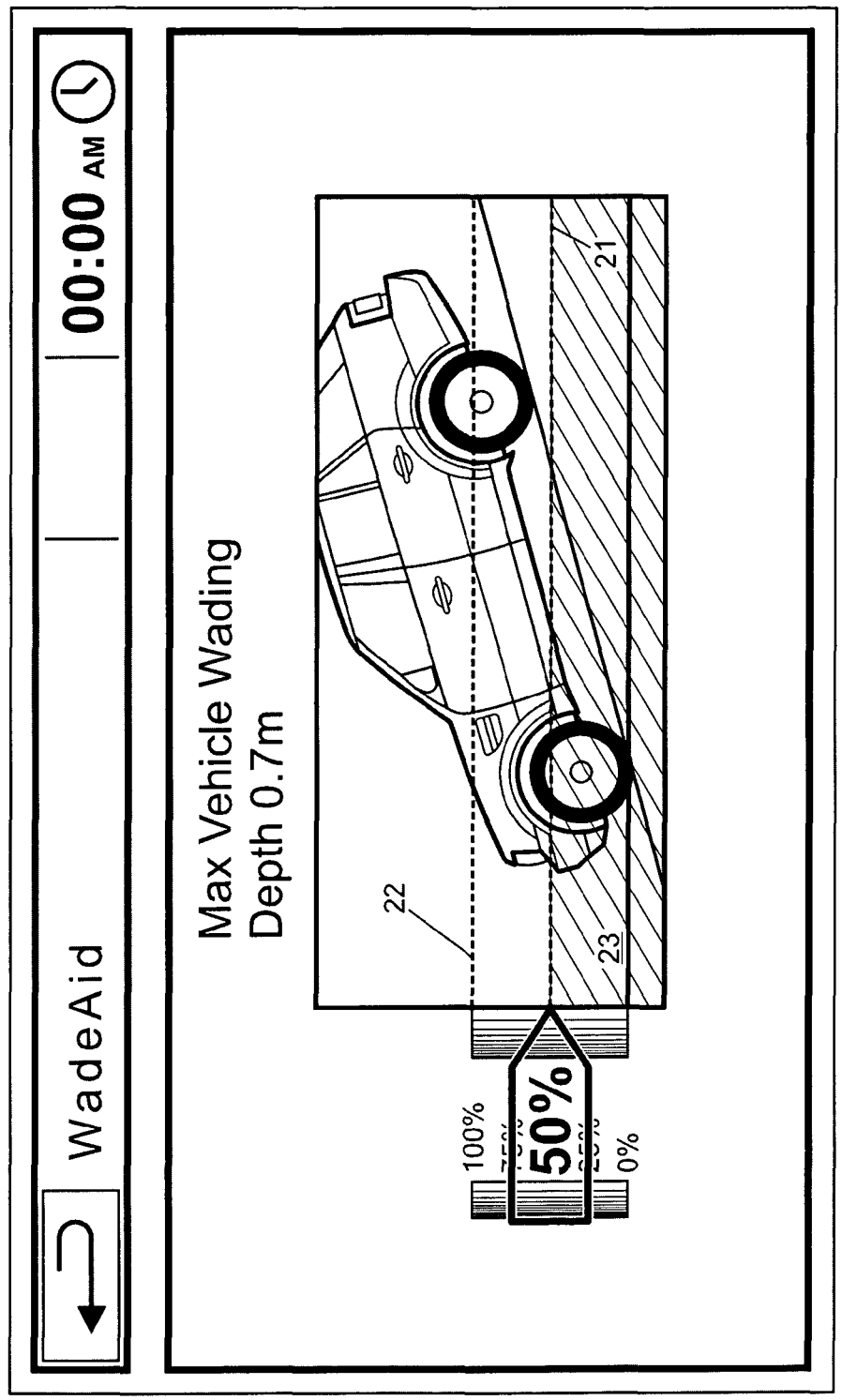

FIG. 16 illustrates a display for the vehicle driver upon detection of water at wading depth, and listing the following:

FIG. 17 illustrates a driver display with input from a vehicle inclination sensor, again showing actual depth 21, and maximum permissible depth 22. A colour wash 23 indicates water. The vehicle representation is shown at the detected inclination.

Figure 18:
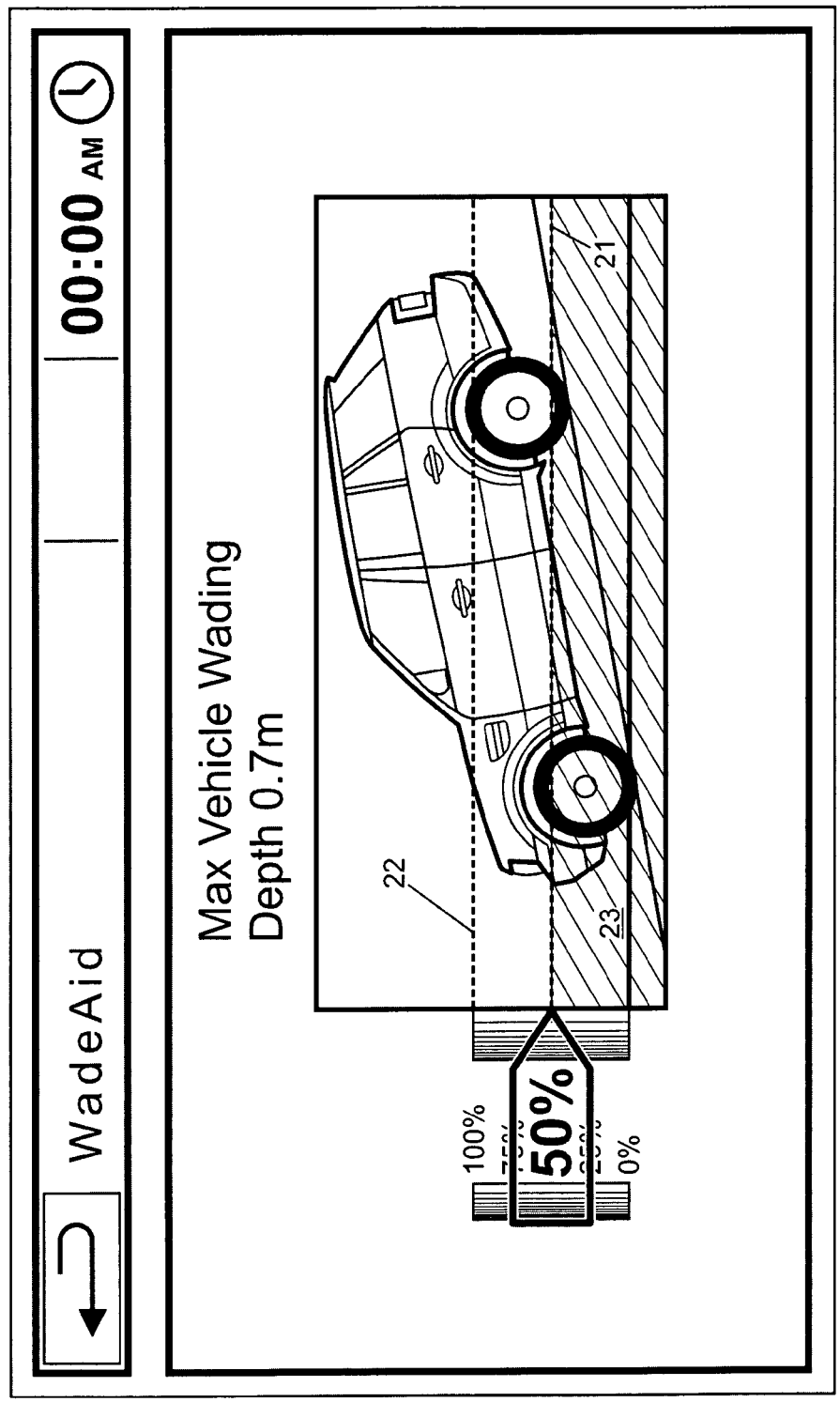

FIG. 18 shows a vehicle at a lesser slope than in FIG. 17.

Figure 19:
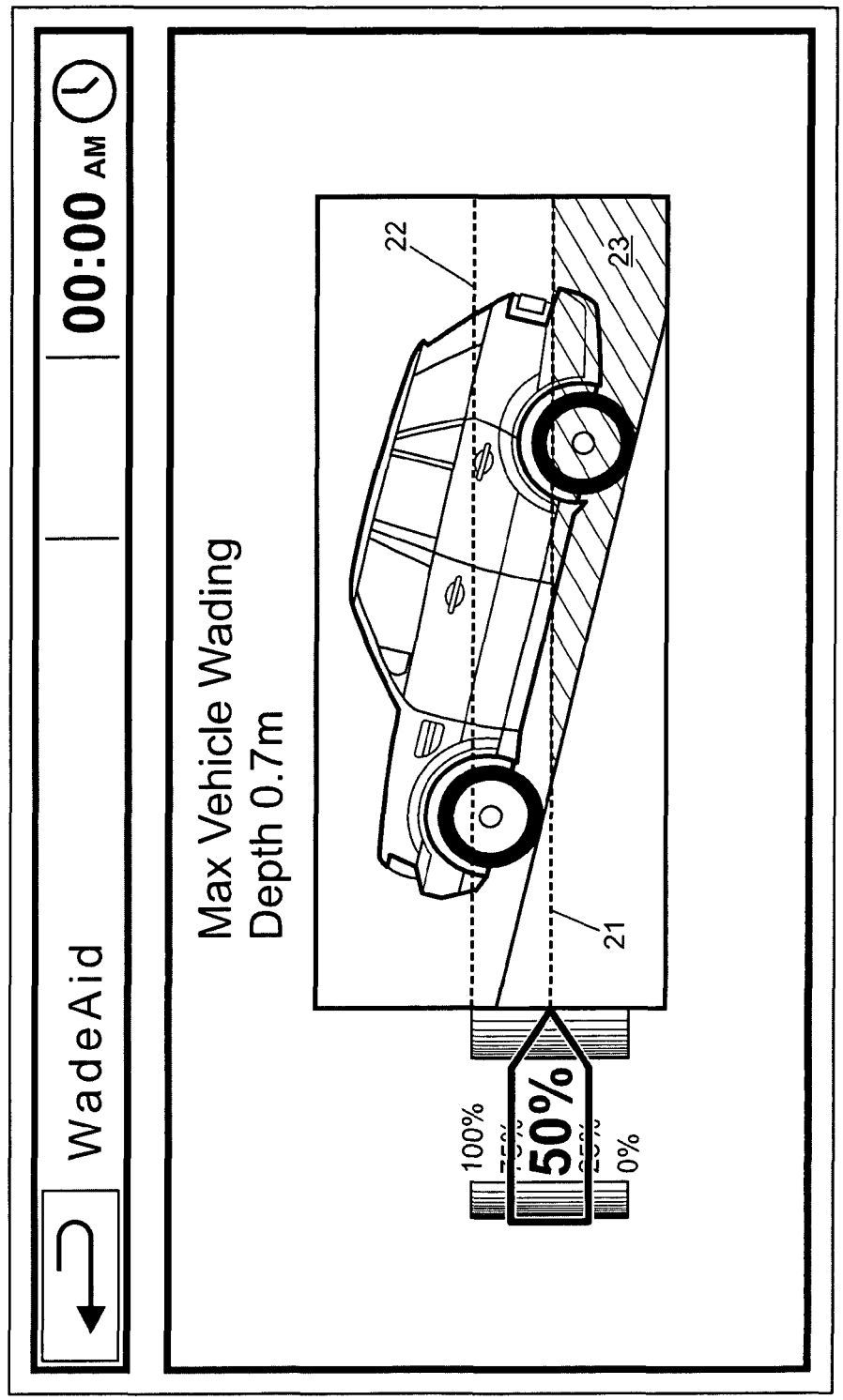

FIG. 19 shows a vehicle reversing into water, for example on a slip way, and utilizing rear facing parking sensors.

Figure 20:
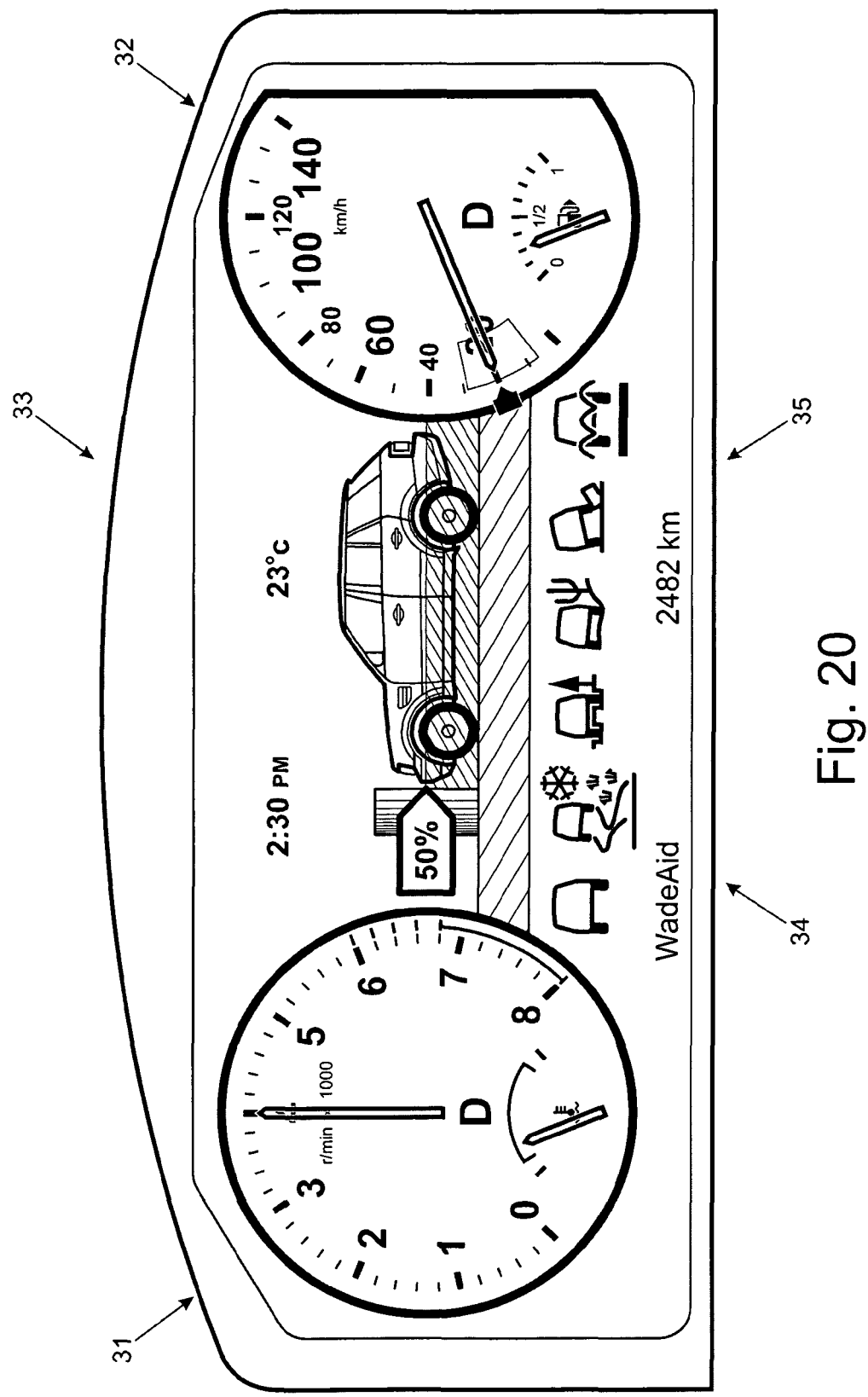

FIG. 20 shows a driver display having the usual speedometer 31 and rev counter 32. A vehicle representation 33, corresponding to FIGS. 1 to 11, is shown in the centre with a text indication of 'Wade Aid' 34.

Four different terrain response icons 35 are shown below the vehicle representation; the mode which is engaged (left most) being illuminated.

Figure 21:
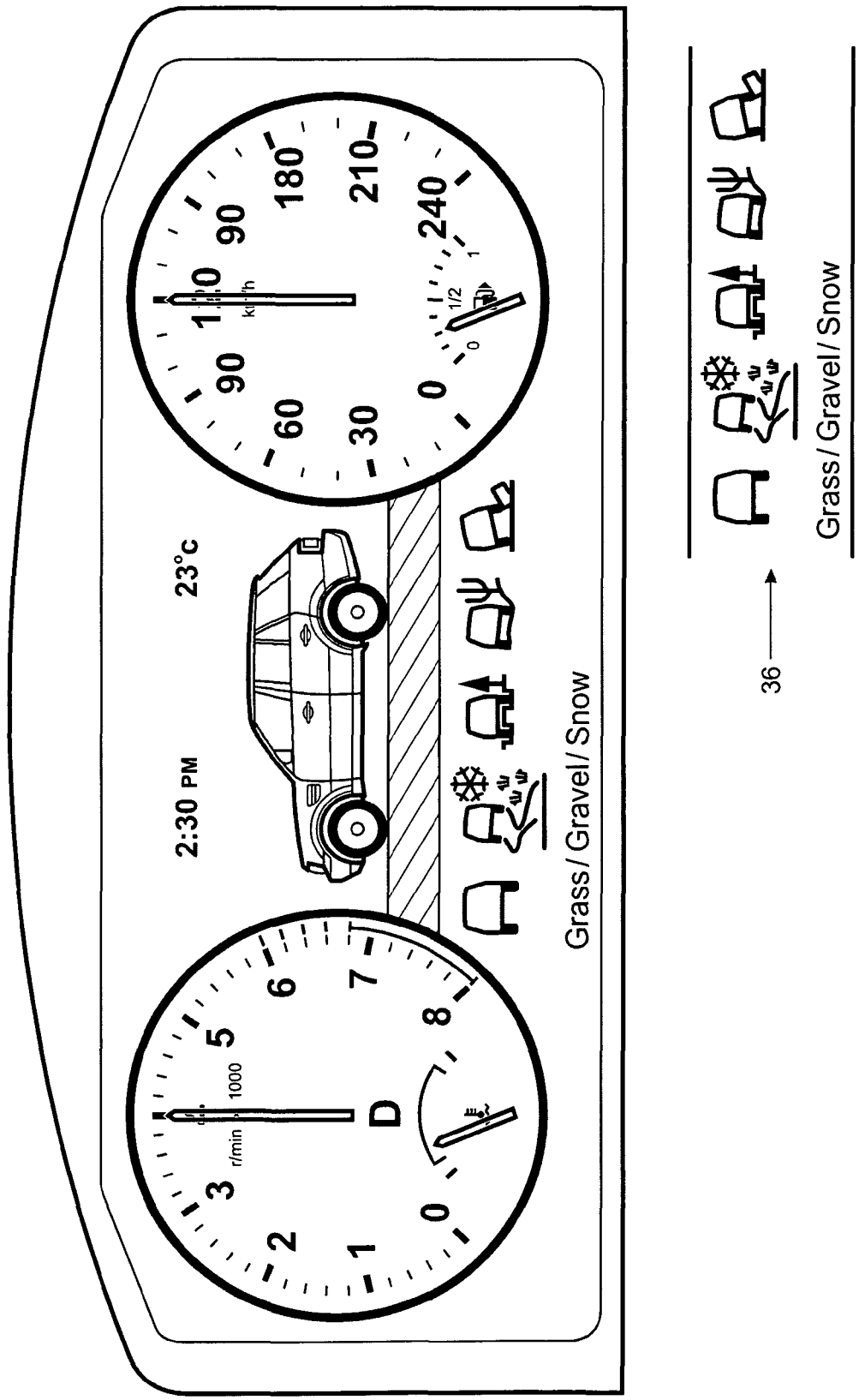

FIG. 21 shows the terrain response icons also in a separate panel 36.

Figure 22:
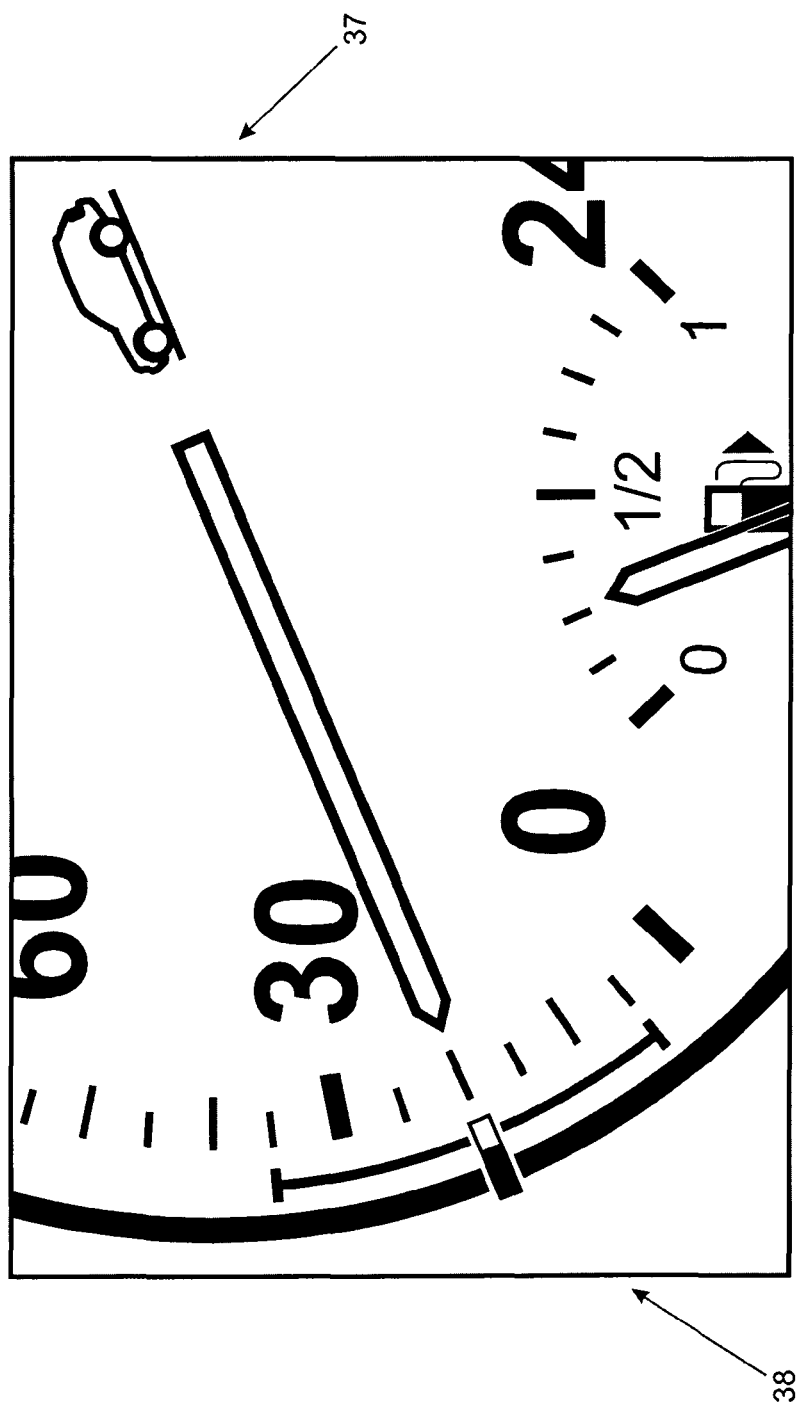

FIG. 22 shows an enlarged portion of the speedometer, an icon 37 indicating descent, and a restricted speed range 38 as an arc around the outside of the speed graduations (in this case extending from 5-35 kph).

Figure 23:
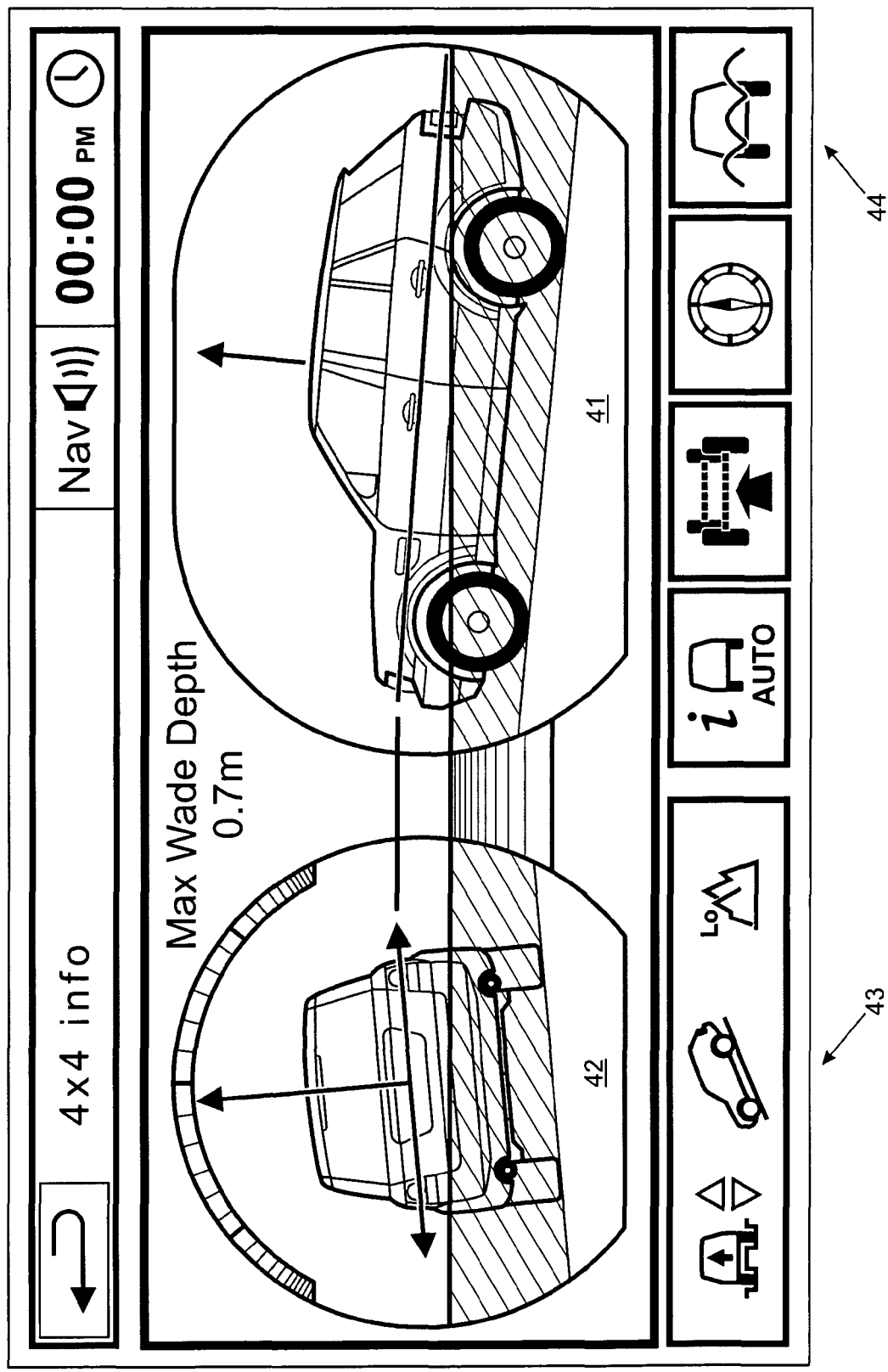

FIG. 23 shows vehicle representations from the side 41 and from one end 42, indicating water level corresponding to vehicle inclination fore and aft, and side to side. An arrow above the vehicle shows nominal deviation from vertical. The vehicle has greater immersion at the rear, and accordingly a rear vehicle view is illustrated. A front view is shown when the front has greater immersion. A lower strip of icons indicate the state of vehicle functions, and include raised suspension 43 and wading 44.

Figure 24:
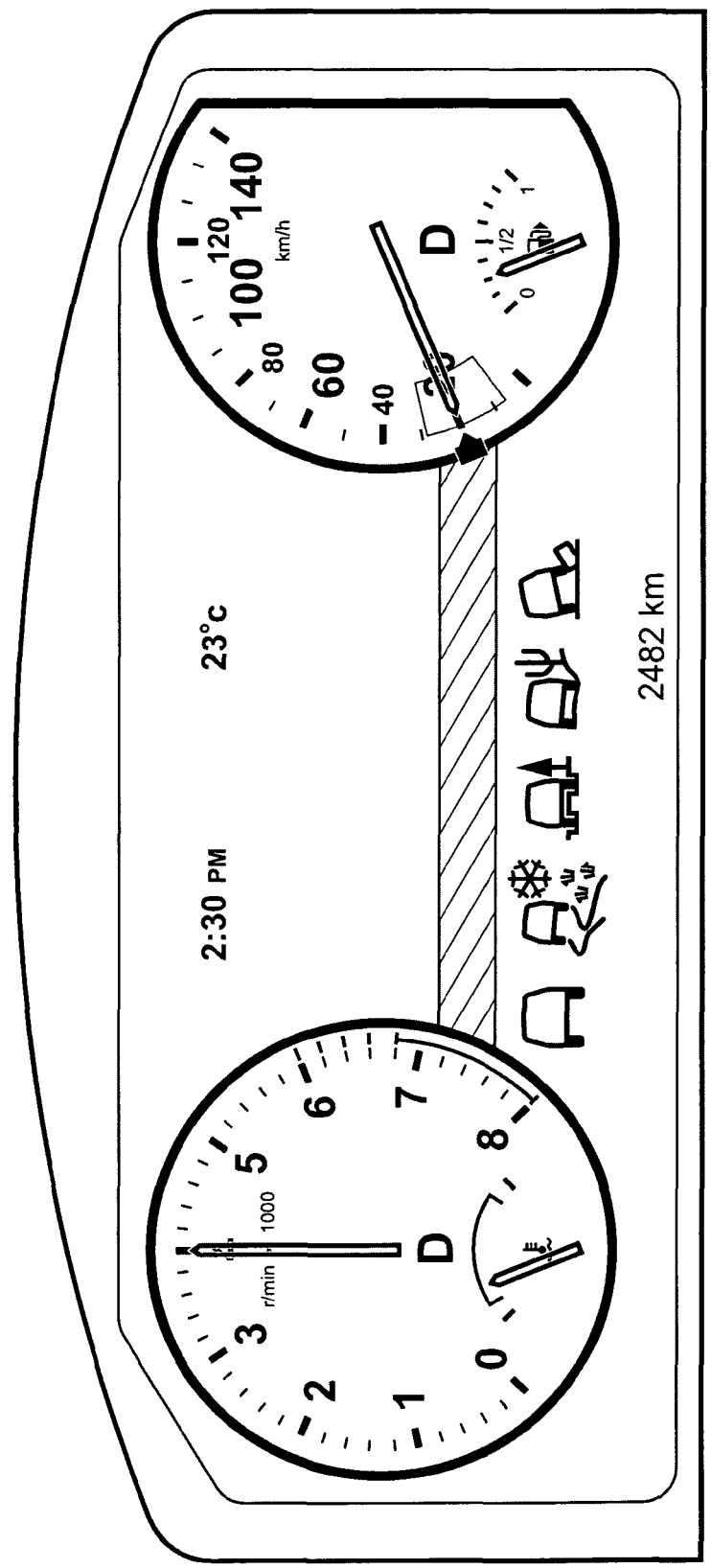
Figure 25:
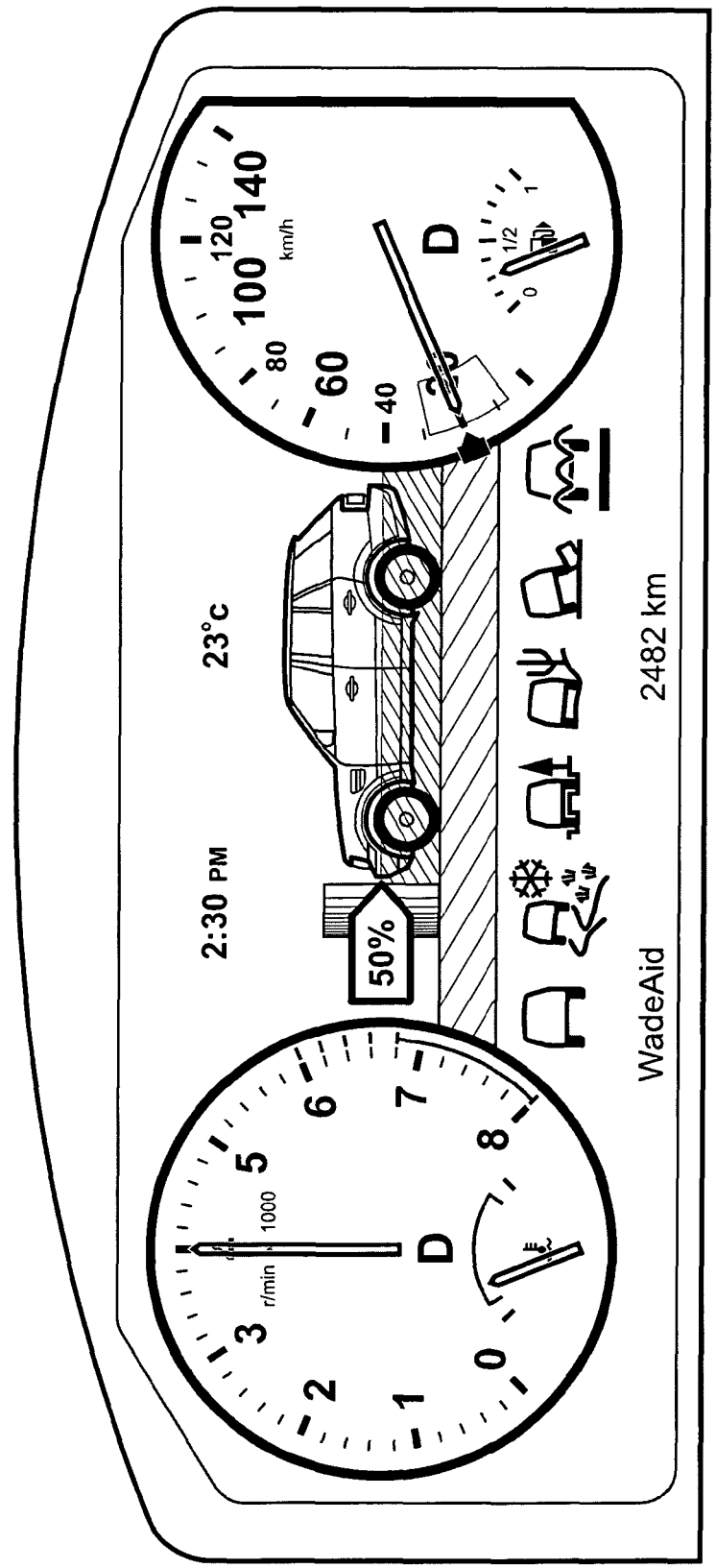

FIG. 24 shows a standard no-wading vehicle driver display, and FIG. 25 is a variation of FIG. 20.

The present application claims priority to UK patent application numbers filed by the present applicant on 15 Dec. 2010 having the application numbers GB1021268.6, GB1021278.5, GB1021272.8, GB1021297.5, GB1021295.9 and GB1027296.7, the contents of each of which are expressly incorporated by reference in their entirety.

The present application is related to the PCT applications, and to UK Patent Applications, filed concurrently with the present application, by the applicant of the present application, which are listed below:

1. PCT application No. PCT/EP2011/072998 to Thuy-Yung TRAN and Edward HOARE filed 15 Dec. 2011, entitled "Ultrasonic Wading Detection System for a Vehicle";
2. PCT application No. PCT/EP2011/072999 to Thuy-Yung TRAN and Edward HOARE, filed 15 Dec. 2011, entitled "Wading Detection System for a Vehicle";
3. PCT application No. PCT/EP2011/072986 to Thuy-Yung TRAN, Edward HOARE and Nigel CLARKE, filed 15 Dec. 2011, entitled "Vehicle Control System";
4. PCT application No. PCT/EP2011/072997 to Thuy-Yung TRAN, Edward HOARE and Nigel CLARKE, filed 15 Dec. 2011, entitled "Wading Depth Estimation For A Vehicle";
5. PCT application No. PCT/EP2011/072988 to "Thuy-Yung TRAN, Edward HOARE and Nigel CLARKE", filed 15 Dec. 2011, entitled "Wading Vehicle Depth Measurement Apparatus";
6. PCT application No. PCT/EP2011/072990 to Thuy-Yung TRAN, Edward HOARE and Nigel CLARKE, filed 15 Dec. 2011, entitled "Vehicle Orientation Device and Method";
7. PCT application No. PCT/EP2011/072991 to Thuy-Yung TRAN, Edward HOARE and Nigel CLARKE, filed 15 Dec. 2011, entitled "Wading Vehicle Depth Measurement Apparatus";
8. PCT application No. PCT/EP2011/072992 to Thuy-Yung TRAN, Edward HOARE, Anthony JONES, Simon THOMSON and Ashutosh TOMAR, filed 15 Dec. 2011, entitled "Wading Vehicle Water Level Display";
9. PCT application No. PCT/EP2011/072994 to Thuy-Yung TRAN, Edward HOARE, Anthony JONES, Simon THOMSON and Ashutosh TOMAR, filed 15 Dec. 2011, entitled "Wading Vehicle Water Level Display".

The contents of the above referenced PCT applications (and corresponding UK applications, filed concurrently and having the same ownership, inventorship and Title as the above listed PCT applications) are hereby expressly incorporated by reference in their entirety into the present application.

The invention claimed is:

1. A method comprising:
    detecting a water level about a vehicle travelling over a submerged ground surface;
    determining an advisory maximum vehicle speed relative to the ground surface in dependence on one or more driving conditions of the vehicle including the detected water level and an inclination of the vehicle;
    displaying said advisory maximum vehicle speed on a driver display of current vehicle speed, wherein the advisory maximum vehicle speed and the current vehicle speed are simultaneously displayed; and
    adjusting said advisory maximum vehicle speed according to the inclination of the vehicle as indicated by an inclination sensor of the vehicle.

2. A method according to claim 1, further comprising calculating the maximum wading depth of the vehicle according to the ride height thereof, and displaying on said display an elevation of a vehicle on which is superimposed said maximum wading depth.

3. A method according to claim 2, further including the step of simultaneously displaying on said display an elevation of a vehicle on which is superimposed the actual wading depth of the vehicle according to information from one or more wading sensors.

4. The method of claim 1, wherein the inclination is a longitudinal inclination of the vehicle.

5. A system for aiding driver control of a wading vehicle travelling over a submerged ground surface; the system comprising a wading depth sensor for detecting a water level about the vehicle, a display, a memory and a processor, the memory containing a program configured to run on the processor to calculate or select an advisory maximum vehicle speed relative to the ground surface in dependence on one or more driving conditions of the vehicle including a current wading depth (D) and an inclination of the vehicle, to display said advisory maximum vehicle speed on the display, wherein the advisory maximum vehicle speed and current vehicle speed are displayed simultaneously, and to adjust said advisory maximum vehicle speed according to the inclination of the vehicle as indicated by an inclination sensor of the vehicle.

6. The system according to claim 5, wherein said memory contains a program configured to run on the processor to calculate or select the maximum wading depth (Dmax) of the vehicle from the vehicle ride height, and to display the maximum wading depth on the display.

7. The system of claim 6, wherein the display comprises an elevation of the vehicle on which is superimposed a line indicative of maximum wading depth.

8. The system of claim 7, wherein the position of said line on said elevation changes according to a selected ride height.

9. The system of claim 5, wherein said display shows a current water level (L) on an elevation of a vehicle, according to said wading depth sensor.

10. The system of claim 9, wherein a maximum wading depth and the current water level L are simultaneously displayed on a common elevation.

11. The system of claim 5, wherein said advisory maximum vehicle speed is selected according to one or more of:
    i) water level through which the vehicle is wading,
    ii) the pitch of the vehicle,
    iii) the angle of the terrain on which the vehicle is travelling.

12. A vehicle according to claim 5, wherein the memory comprises a program configured to run on the processor to calculate or select said advised maximum wading speed of the vehicle from one or more of (i) the water level through which the vehicle is wading, (ii) the pitch of the vehicle and (iii) the angle of the terrain on which the vehicle is travelling.

13. A vehicle comprising the system according to claim 5, wherein the processor is coupled to the display.

14. The vehicle of claim 13, wherein said memory of the system contains a program configured to run on the processor of the system to calculate or select the maximum wading depth (Dmax) of the vehicle, and to display the maximum wading depth on the display of the system.

15. The vehicle of claim 14, and wherein the maximum wading depth is adjusted depending on the movement and/or orientation of the vehicle.

16. The vehicle of claim 14, wherein the maximum wading depth is one of the height of an engine air intake of the vehicle, when traveling forward; and the height of the bottom of a tailgate glazing of the vehicle, when traveling rearwardly.

17. The system of claim 5, wherein the wading depth sensor is an ultrasonic sensor.

18. A method comprising:
    detecting a water level about a vehicle; determining an advisory maximum vehicle speed in dependence on one or more driving conditions of the vehicle including the detected water level and an inclination of the vehicle;

displaying the advisory maximum vehicle speed and the detected water level on a driver display, wherein the driver display comprises a speedometer on which the advisory maximum vehicle speed and current vehicle speed are simultaneously displayed, and an elevation of the vehicle on which the detected water level is displayed; and adjusting said advisory maximum vehicle speed according to the inclination of the vehicle as indicated by an inclination sensor of the vehicle.

19. The method of claim 18, further comprising calculating a maximum wading depth of the vehicle and displaying the calculated maximum wading depth on the elevation of the vehicle.

20. The method of claim 19, further comprising displaying an indication of the percentage of the maximum wading depth to which the detected water level corresponds.

21. The method of claim 18, further comprising measuring the inclination of the vehicle and displaying the elevation of the vehicle in accordance with the measured inclination.

\* \* \* \* \*